(12) United States Patent  
Hirano

(10) Patent No.: US 8,498,266 B2  
(45) Date of Patent: Jul. 30, 2013

(54) WIRELESS COMMUNICATION SYSTEM AND ITS METHOD, AND DEVICE AND PROGRAM USED FOR SAME

(75) Inventor: Yumi Hirano, Tokyo (JP)

(73) Assignee: NEC Corporation, Tokyo (JP)

( * ) Notice: Subject to any disclaimer, the term of this patent is extended or adjusted under 35 U.S.C. 154(b) by 1020 days.

(21) Appl. No.: 12/377,425

(22) PCT Filed: Jul. 26, 2007

(86) PCT No.: PCT/JP2007/064642  
§ 371 (c)(1),  
(2), (4) Date: Feb. 13, 2009

(87) PCT Pub. No.: WO2008/020536  
PCT Pub. Date: Feb. 21, 2008

(65) Prior Publication Data  
US 2010/0014495 A1 Jan. 21, 2010

(30) Foreign Application Priority Data  
Aug. 15, 2006 (JP) ................................. 2006-221368

(51) Int. Cl.  
*H04W 4/00* (2009.01)  
*H04B 17/00* (2006.01)  
*H04Q 7/20* (2006.01)

(52) U.S. Cl.  
USPC ........ 370/331; 370/328; 370/338; 455/67.11; 455/435.2; 455/436

(58) Field of Classification Search  
USPC ................. 370/200–349; 455/41.2, 437–442, 455/464, 552.1, 67.11–436  
See application file for complete search history.

(56) References Cited

U.S. PATENT DOCUMENTS

| 6,542,747 | B1 * | 4/2003 | Syukri .......................... 455/450 |
| 8,036,662 | B2 * | 10/2011 | Watanabe et al. ............. 455/436 |
| 2005/0078633 | A1 * | 4/2005 | Watanabe et al. ............. 370/331 |
| 2005/0119001 | A1 | 6/2005 | Watanabe |

(Continued)

FOREIGN PATENT DOCUMENTS

| CN | 1329805 A | 1/2002 |
| JP | 2000236569 A | 8/2000 |

(Continued)

OTHER PUBLICATIONS

Japanese Office Action for JP2008-529838 issued Dec. 7, 2011.

(Continued)

*Primary Examiner* — Afsar M Qureshi

(57) ABSTRACT

Wireless LAN base station devices (107 to 109) monitored by a wireless LAN base station monitoring server device (105) send wireless LAN base station information on themselves to the wireless LAN base station monitoring server device (105). A combined wireless terminal (110) which is to start communication requests the wireless LAN base station information on connectable wireless LAN base station devices. The wireless LAN base station monitoring server device (105) sends information on whether or not there is any connectable base station device and, if any, the connectable wireless LAN base station information according to information acquired from the combined wireless terminal (110) having requested the wireless LAN base station information via a 3G network (102). The combined wireless terminal (110) having received the wireless LAN base station information determines whether or not to set up a connection to a wireless LAN network (103) from the wireless LAN base station information.

27 Claims, 19 Drawing Sheets

U.S. PATENT DOCUMENTS

| | | | |
|---|---|---|---|
| 2005/0185651 A1* | 8/2005 | Rinne | 370/395.1 |
| 2005/0272428 A1* | 12/2005 | Tanabe et al. | 455/439 |
| 2006/0094431 A1* | 5/2006 | Saifullah et al. | 455/436 |
| 2006/0183476 A1* | 8/2006 | Morita et al. | 455/435.2 |

FOREIGN PATENT DOCUMENTS

| | | | |
|---|---|---|---|
| JP | 2002077965 A | | 3/2002 |
| JP | 2002236632 | * | 8/2002 |
| JP | 2002236632 A | | 8/2002 |
| JP | 2003259457 A | | 9/2003 |
| JP | 2004349976 A | | 12/2004 |
| JP | 2004356815 A | | 12/2004 |
| JP | 2005086471 A | | 3/2005 |
| JP | 2005159929 A | | 6/2005 |
| JP | 2005168041 A | | 6/2005 |
| JP | 2005269109 A | | 9/2005 |
| JP | 2005341311 A | | 12/2005 |
| JP | 2005341610 A | | 12/2005 |
| JP | 2006060295 A | | 3/2006 |
| WO | 2006048721 A2 | | 5/2006 |
| WO | 2006061184 A | | 6/2006 |

OTHER PUBLICATIONS

Taiwanese Office Action for TW1002034174001 issued Apr. 26, 2011.

International Search Report for PCT/JP2007/064642 dated Aug. 28, 2007.

Japanese Final Office Action for JP2008-529838 mailed Mar. 14, 2012.

B-5-131 RAN—Overlaid MIRAI System: (1) Overview presented by Masugi Inoue, Khaled Mahmud, Homare Murakami, Mikio Hasegawa and Hiroyuki Morikawa, Proceedings of the IEICE Conference issued by the Institute of Electronics, Information and Communication engineers, 2003_Communication (1), pp. 590, Mar. 3, 2003.

Vertical-handover Method using Simultaneous Bindings presented by Homare Murakami, Khaled Mahmud, Mikio Hasegawa, Masugi Inoue and Hiroyuki Morikawa, Proceedings of the IEICE Conference issued by the Institute of Electronics, Information and Communication engineers, 2003_Communication (1), pp. 592, Mar. 3, 2003.

Context-based Network and Application Management System for Seamless Services in Heterogeneous Networks presented by Masugi Inoue, Khaled Mahmud, Homare Murakami, Mikio Hasegawa and Hiroyuki Morikawa, IPSJ Journal issued by the Information Processing Society of Japan, 46(9), pp. 2236-2249, Sep. 15, 2005.

Office action issued by Chinese patent office in counterpart CN patent application 200780038418.X, dated Apr. 2, 2013.

* cited by examiner

WIRELESS COMMUNICATION SYSTEM AND ITS METHOD, AND DEVICE AND PROGRAM USED FOR SAME

INCORPORATION BY REFERENCE

This application is the National Phase of PCT/JP2007/064642 filed Jul. 26, 2007, and is based upon and claims the benefit of priority from Japanese patent application No. 2006-221368, filed on Aug. 15, 2006, the disclosure of which is incorporated herein in its entirety by reference.

APPLICABLE FIELD IN THE INDUSTRY

The present invention relates to a wireless communication control technique and system, and more particularly to a wireless communication control technique, device and system that enable a terminal device connectable to a plurality of wireless communication networks to efficiently select the communication network.

BACKGROUND ART

In recent years, a combined wireless terminal device connectable to a network as well such as a wireless LAN network that is narrow in a cell range but is capable of making high-speed communication, in addition to a wireless communication network such as a 3G network that is slow in communication but is wide in a cell range, has made its appearance.

One example of the wireless base station device and the wireless terminal device of this type, which have been conventionally developed, is described in Patent document 1. These devices are employed for a purpose of easily realizing an inter-system handover scheme without increasing a load imposed upon the wireless terminal device. As shown in FIG. 1, the system is configured of a combined wireless terminal device and base station devices for a plurality of networks. The system having this configuration operates as follows. The base station apparatus of a 3G wireless communication network acquires periodically position registration information of the base station device of the wireless LAN network. Further, the terminal device acquires position information of the wireless LAN base station device from the 3G communication network base station device, and acquires a band occupation situation of a wireless channel within a cell of the above wireless LAN base station with a scan by the wireless LAN communication.

Patent document 1: JP-P2005-269109A (FIG. 1 and paragraphs 0023 and 0024)
Patent document 2: JP-P2005-086471A

DISCLOSURE OF THE INVENTION

Problems to be Solved by the Invention

The point at issue is that the wireless LAN communication is a large burden to the terminal device. The reason is that the wireless LAN communication demands a larger consumption power as compared with the low-speed communication like the 3G network communication in exchange of the fact that the high-speed communication is enabled. The subject of the consumption power becomes, in particular, a big subject to a mobile wireless terminal device. Examining closely, the consumption power caused by scanning the wireless LAN base station and the consumption power during communication become a subject. The so-called "during communication" is a situation where the communication linked to an application separately from communication relating to the communication control such as the scan is being made, and the above communication signifies data communication, voice communication, etc.

The wireless LAN base station is periodically scanned. Further, a communication packet relating to the scan is not particularly big in size, and besides, the number of the communication packets required for the scan is only several. At that moment, deliberately employing the high-speed network like the wireless LAN becomes wasteful from a viewpoint of saving the power. The technology of the Patent document 1, being a Patent document for solving the subject of the consumption power caused by such a scan, cannot completely eliminate the wastefulness of the consumption power caused by scanning the wireless LAN base station because the terminal device acquires a band occupation situation within the wireless LAN base station cell by the scan in the wireless LAN communication even though it acquires position information of the wireless LAN base station via the 3G communication network base station device.

Further, also during communication, when a connection to the wireless LAN network is set up in the case of the communication in which data does not need to be transmitted at a high speed, for example, in the case that a data quantity that should be transmitted at a time is few and data does not need to be transmitted at a high speed because the packet size is small, in the case that when employment of another network alleviates the burden in terms of the cost, or the like, high speediness, inexpensiveness, etc. which are special features of the wireless LAN, cannot be put to practical use, and the wastefulness is generated from a viewpoint of saving the power. Thus, at the moment of commencing communication, a determination as to whether to set up a connection to the wireless LAN network or to set up a connection to the 3G network has to be synthetically made from a viewpoint of the band occupation situation within the wireless LAN base station cell, the required quality, the saving of the power, etc.

Thereupon, the present invention has been accomplished in consideration of the above-mentioned problems, and an object thereof lies in a point that the wireless LAN terminal device acquires a position and band information of the connection wireless LAN base station without directly scanning the wireless LAN base station, thereby allowing the consumption power due to the scan to be reduced.

Further, another object of the present invention lies in a point that providing the system and the device for selecting an appropriate wireless LAN network so that a connection to the wireless LAN network is set up only when an advantage of the wireless LAN can be put to practical use causes a wireless LAN transceiver to operate only when necessary, thereby allowing the consumption power during communication to be reduced.

Means for Solving the Problems

The present invention for achieving the above-mentioned object is a wireless communication system in which a wireless terminal is connectable to two wireless communication networks or more, said wireless communication system comprising: an acquiring means for acquiring communication quality information associated with a communication quality of a base station in a predetermined wireless communication network to which the wireless terminal can set up a connection; and a determining means for determining whether said wireless terminal sets up a connection to said predetermined wireless communication network based upon said communication quality information.

The present invention for achieving the above-mentioned object is a wireless communication system in which a wireless terminal is connectable to two wireless communication networks or more, said wireless communication system comprising: an acquiring means for acquiring communication quality information associated with a communication quality of a base station in a predetermined wireless communication network to which the wireless terminal can set up a connection through the communication network except said predetermined wireless communication network; and a determining means for determining whether said wireless terminal sets up a connection to said predetermined wireless communication network based upon said communication quality information.

The present invention for achieving the above-mentioned object is a wireless communication system comprising: a server comprising: a quality information acquiring means for acquiring communication quality information associated with a communication quality of a base station in a predetermined wireless communication network; a determining means for determining whether said wireless terminal sets up a connection to said predetermined wireless communication network based upon the communication quality information of the base station to which said wireless terminal is connectable, out of the base stations in said predetermined wireless communication network; and a means for transmitting a determination result by said determining means to said wireless terminal via a wireless communication network except said predetermined wireless communication network; and a wireless terminal comprising a means for receiving said determination result of the connection via the wireless communication network except said predetermined wireless communication network, and setting up a connection to said predetermined wireless communication network based upon said determination result of the connection.

The present invention for achieving the above-mentioned object is a server for managing a wireless terminal that can set up a connection to two wireless communication networks or more, said server comprising:

an acquiring means for acquiring communication quality information associated with a communication quality of a base station in a predetermined wireless communication network; and a means for transmitting the communication quality information of the base station to which said wireless terminal is connectable, out of the base stations in said predetermined wireless communication network, to said wireless terminal via the wireless communication network except said predetermined wireless communication network.

The present invention for achieving the above-mentioned object is a server for managing a wireless terminal that can set up a connect to two wireless communication networks or more, said server comprising: an acquiring means for acquiring communication quality information associated with a communication quality of a base station in a predetermined wireless communication network; a determining means for determining whether said wireless terminal sets up a connection to said predetermined wireless communication network based upon the communication quality information of the base station to which said wireless terminal is connectable, out of the base stations in said predetermined wireless communication network; and a means for transmitting a determination result by said determining means to said wireless terminal via the wireless communication network except said predetermined wireless communication network.

The present invention for achieving the above-mentioned object is a wireless terminal that can set up a connection to two wireless communication networks or more, said wireless terminal comprising: a means for receiving communication quality information of a base station of a predetermined wireless communication network via the wireless communication network except said predetermined wireless communication network; and a determining means for determining whether to set up a connection to said predetermined wireless communication network based upon said communication quality information.

The present invention for achieving the above-mentioned object is a wireless terminal that can set up a connection to two wireless communication networks or more, said wireless terminal comprising: a means for receiving a determination as to whether or not a connection to a base station of a predetermined wireless communication network is possible via the wireless communication network except said predetermined wireless communication network; and a means for setting up a connection to said predetermined wireless communication network based upon said determination as to whether or not a connection is possible.

The present invention for achieving the above-mentioned object is a wireless communication method in which a connection to two wireless communication networks or more is possible, said wireless communication method comprising: acquiring communication quality information associated with a communication quality of a base station in a predetermined wireless communication network to which a wireless terminal can set up a connection; and determining whether said wireless terminal sets up a connection to said predetermined wireless communication network based upon said communication quality information.

The present invention for achieving the above-mentioned object is a wireless communication method in which a connection to two wireless communication networks or more is possible, said wireless communication method comprising: acquiring communication quality information associated with a communication quality of a base station in a predetermined wireless communication network to which a wireless terminal can set up a connection through the communication network except said predetermined wireless communication network; and determining whether said wireless terminal sets up a connection to said predetermined wireless communication network based upon said communication quality information.

The present invention for achieving the above-mentioned object is a program of a server for managing a wireless terminal that can set up a connection to two wireless communication networks or more, said program causing the server to execute the processes of: acquiring communication quality information associated with a communication quality of a base station in a predetermined wireless communication network; and transmitting the communication quality information of the base station to which said wireless terminal is connectable, out of the base stations in said predetermined wireless communication network, to said wireless terminal via the wireless communication network except said predetermined wireless communication network.

The present invention for achieving the above-mentioned object is a program of a server for managing a wireless terminal that can set up a connection to two wireless communication networks or more, said program causing the server to execute the processes of: acquiring communication quality information associated with a communication quality of a base station in a predetermined wireless communication network; determining whether said wireless terminal sets up a connection to said predetermined wireless communication network based upon the communication quality information of the base station to which said wireless terminal is connectable, out of the base stations in said predetermined wireless communication network; and transmitting said determination result to said wireless terminal via the wireless communication network except said predetermined wireless communication network.

The present invention for achieving the above-mentioned object is a program of a wireless terminal that can set up a connection to two wireless communication networks or more, said program causing the wireless terminal to execute the processes of:

receiving communication quality information of a base station of a predetermined wireless communication network via the wireless communication network except said predetermined wireless communication network; and determining whether to set up a connection to said predetermined wireless communication network based upon said communication quality information.

The present invention for achieving the above-mentioned object is a program of a wireless terminal that can set up a connection to two wireless communication networks or more, said program causing the wireless terminal to execute the processes of: receiving a determination as to whether or not a connection to a base station of a predetermined wireless communication network is possible via the wireless communication network except said predetermined wireless communication network; and setting up a connection to said predetermined wireless communication network based upon said determination as to whether or not a connection is possible.

The present invention for achieving the above-mentioned object is a base station device in a wireless communication system in which a wireless terminal can set up a connection to two wireless communication networks or more, said base station device comprising a transmitting means for transmitting communication quality information associated with a communication quality of said base station to a determining means for determining whether said wireless terminal sets up a connection to said predetermined wireless communication network.

The present invention for achieving the above-mentioned object is a base station device in a wireless communication system in which a wireless terminal can set up a connection to two wireless communication networks or more, said base station device comprising a means for determining whether a communication quality of its own station satisfies a communication quality that said wireless terminal requests, and transmitting its determination result to said wireless terminal via the wireless communication network different from the wireless communication network of its own station.

An Advantageous Effect of the Invention

An effect of the present invention lies in a point that effectively suppressing communication using the communication technique of which the consumption power is large, for example, communication using the wireless LAN makes it possible to realize the saving of the power in a terminal device side.

A first reason for it is that information of the connectable wireless LAN base station, for example, the band occupation situation, the base station information necessary for a connection, or the like is acquired via the 3G network instead of scanning the wireless LAN base station by using the wireless LAN communication, which was a burden to the terminal device making wireless LAN communication etc. in terms of the power.

A second reason is that selecting an appropriate communication network by additionally taking application information and residual quantity information of an electric cell as a determination material besides the information of the connectable wireless LAN base station, for example, the band occupation situation and the base station information necessary for a connection makes it possible to suppress the communication of which the consumption power is large, for example, the wireless LAN communication to a minimum level.

Figure 1:
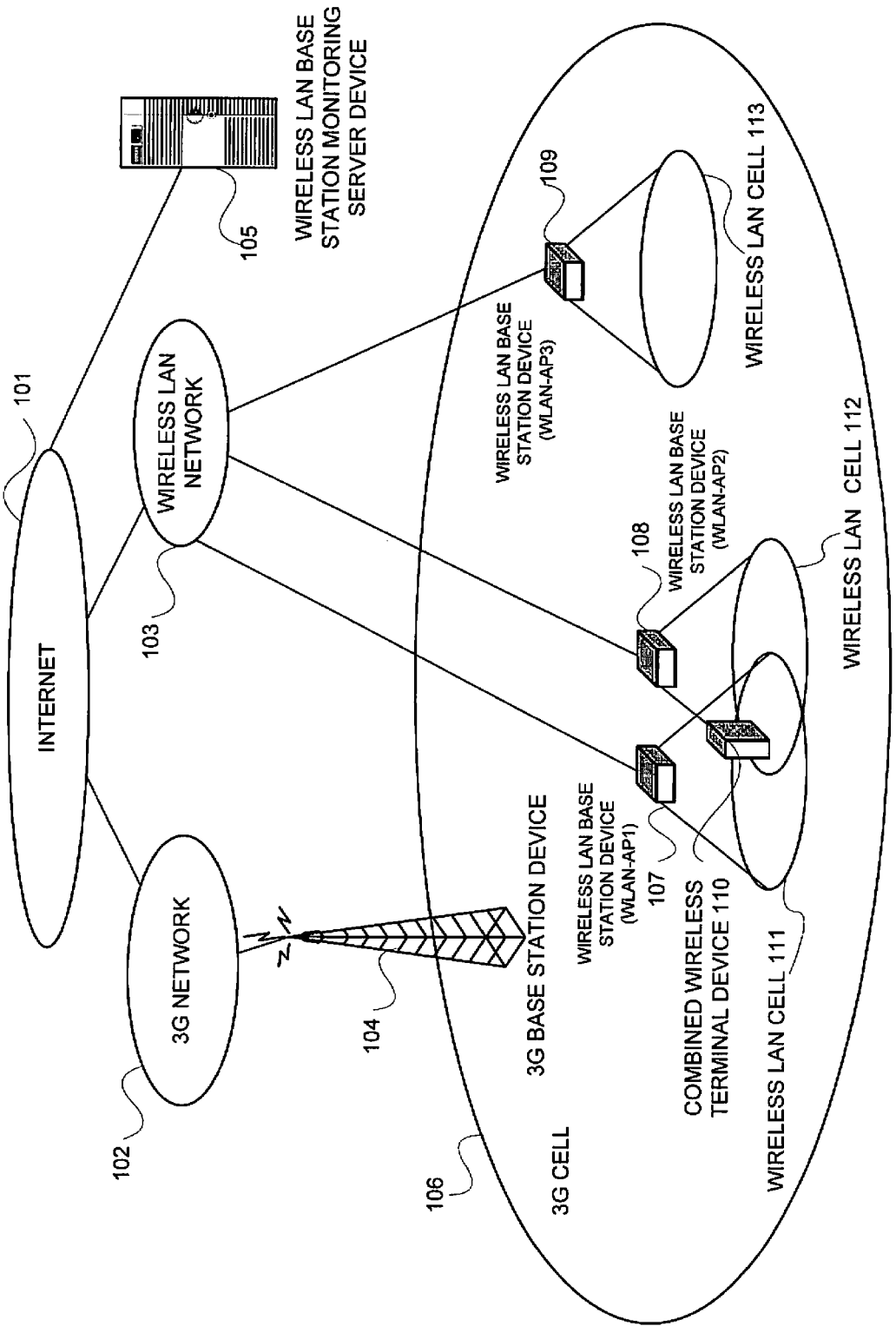
FIG. 1 is a view illustrating a wireless system configuration in a first embodiment of the present invention.

DESCRIPTION OF NUMERALS 102 3G network
103 wireless LAN network
104 3G base station device
105 wireless LAN base station monitoring server device
106 3G cell
107, 108, and 109 wireless LAN base station devices
110 combined wireless terminal device

BEST MODE FOR CARRYING OUT THE INVENTION

A first embodiment of the present invention will be explained in details by making a reference to the accompanied drawings.

The present invention is characterized in, in a communication system in which a connection to two wireless communication networks or more each of which differs from the other is possible, acquiring communication quality information of the base station of one wireless communication network via another communication network different from the above wireless communication network, and determining whether the wireless terminal should set up a connection to the wireless communication network based upon the above communication quality information. Additionally, while the present invention is applicable to the communication system in which a connection to two wireless communication networks or more each of which differs from the other is possible, the present invention is preferably applied to the communication system in which a wireless communication network (hereinafter, referred to as a wide-range and low-speed wireless communication network), which is wide in a range where a connection to the communication network is possible, but is slow in a transfer speed of data, and a wireless communication network (hereinafter, referred to as a narrow-range and high-speed wireless communication network), which is narrow in a range where a connection to the communication network is possible, but is fast in a transfer speed of data coexist. In the following explanation, as an example of the system having different wireless communication networks, the wireless LAN network, being representative of the narrow-range and high-speed wireless communication network, and the 3G network, being representative of the wide-range and low-speed wireless communication network, etc. are exemplified for explanation; however the wireless communication network is not limited hereto. For example, there exists Blue Tooth, or the like as a narrow-range and high-speed wireless communication network, and there exists WiMAX (Worldwide Interoperability for Microwave Access: IEEE 802.16a), PHS, IEEE 802.20, or the like as a wide-range and low-speed wireless communication network.

FIG. 1 is a view illustrating one example of a configuration of the wireless communication control system in the embodiment of the present invention. Upon making a reference to FIG. 1, the wireless communication control system in the embodiment includes a combined wireless terminal device 110 that can make communication with both of a 3G network 102 and a wireless LAN network 103, wireless LAN base station devices 107, 108, and 109, a 3G base station device 104, and a wireless LAN base station monitoring server device 105.

The combined wireless terminal device 110 exists both within a 3G cell 106 range and within wireless LAN base station cells 111 and 112 ranges. The combined wireless terminal device 110 is connectable to the wireless LAN network 103 via the wireless LAN base station devices 107 and 108, and is connectable to the 3G network 102 via the 3G base station device 104.

The wireless LAN base station monitoring server device 105 can make communication with each of the wireless LAN base station devices 107 to 109 within the 3G cell 106 range, and further, monitors the wireless LAN base station devices 107 to 109. In addition hereto, it can make communication with the combined wireless terminal device 110 through the 3G base station device 104.

<Explanation of a Configuration of the Wireless LAN Base Station Devices 107 to 109>

Figure 2:
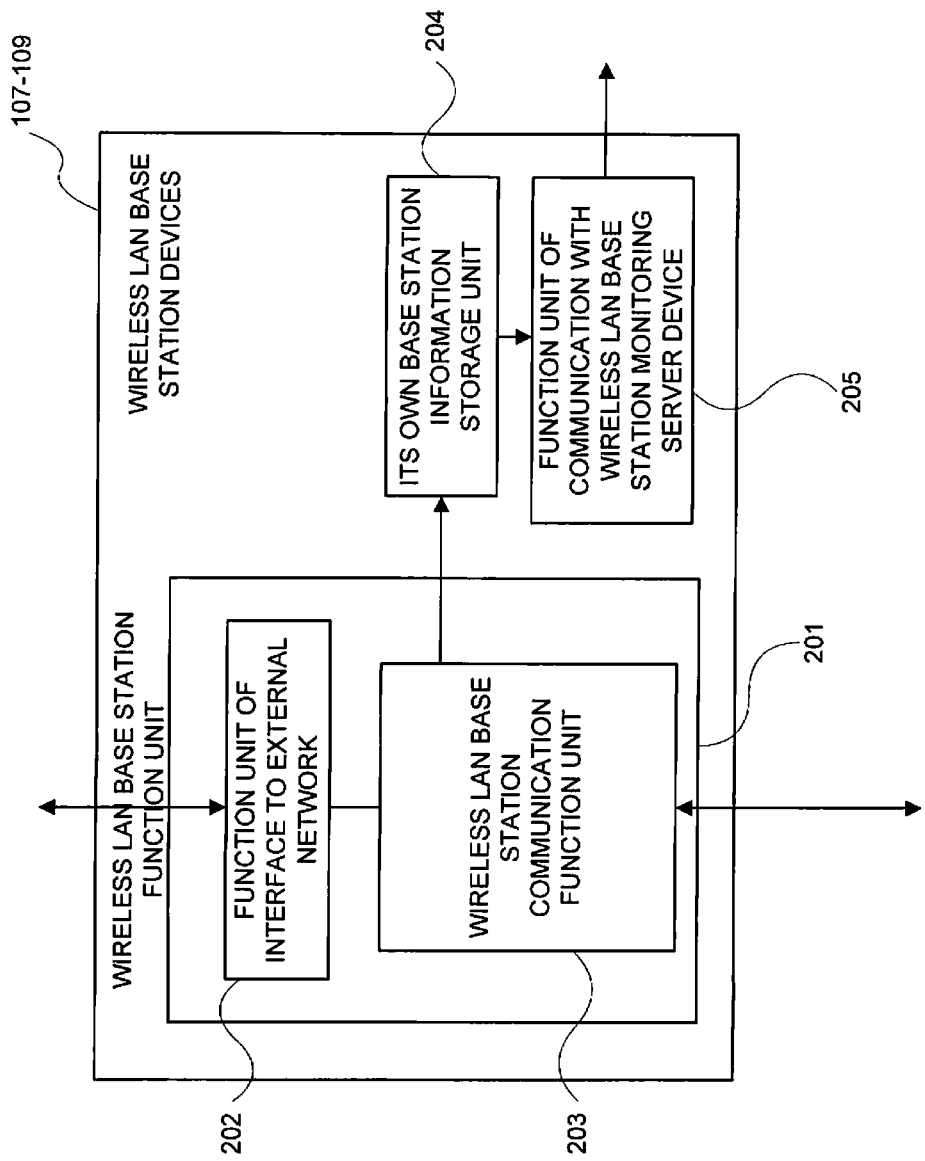
FIG. 2 is a view illustrating a configuration of a wireless LAN base station device in the first embodiment of the present invention.

FIG. 2 is a view illustrating a configuration of the wireless LAN base station devices 107 to 109 relating to the present invention.

Each of the wireless LAN base station devices 107 to 109 includes an its own base station information storage unit 204 and a communication function unit 205 for making communication with the wireless LAN base station monitoring server device in addition to an function unit 202 of interface to an external network and a wireless LAN base station communication function unit 203 that constitute a normal wireless LAN base station function unit 201.

The its own base station information storage unit 204 acquires a position of its own base station, a band occupation situation (communication quality information), base station information necessary for setting up a connection to its own station, etc. from a wireless LAN base station communication function unit 201, and stores them as its own base station information. Additionally, the position of its own base station does not need to be acquired when it has been already stored in the wireless LAN base station monitoring server device 105. And, the its own base station information is notified to the wireless LAN base station monitoring server device 105 via the function unit 205 of communication with the wireless LAN base station monitoring server device 105. Additionally, communication between each of the wireless LAN base station devices 107 to 109 and the wireless LAN base station monitoring server device 105 is made via an internet 101, and a 3G network, a wireless LAN network, a wire network, etc. are thinkable as an access network that is used at that moment.

<Explanation of the Wireless LAN Base Station Monitoring Server Device 105>

Figure 3:
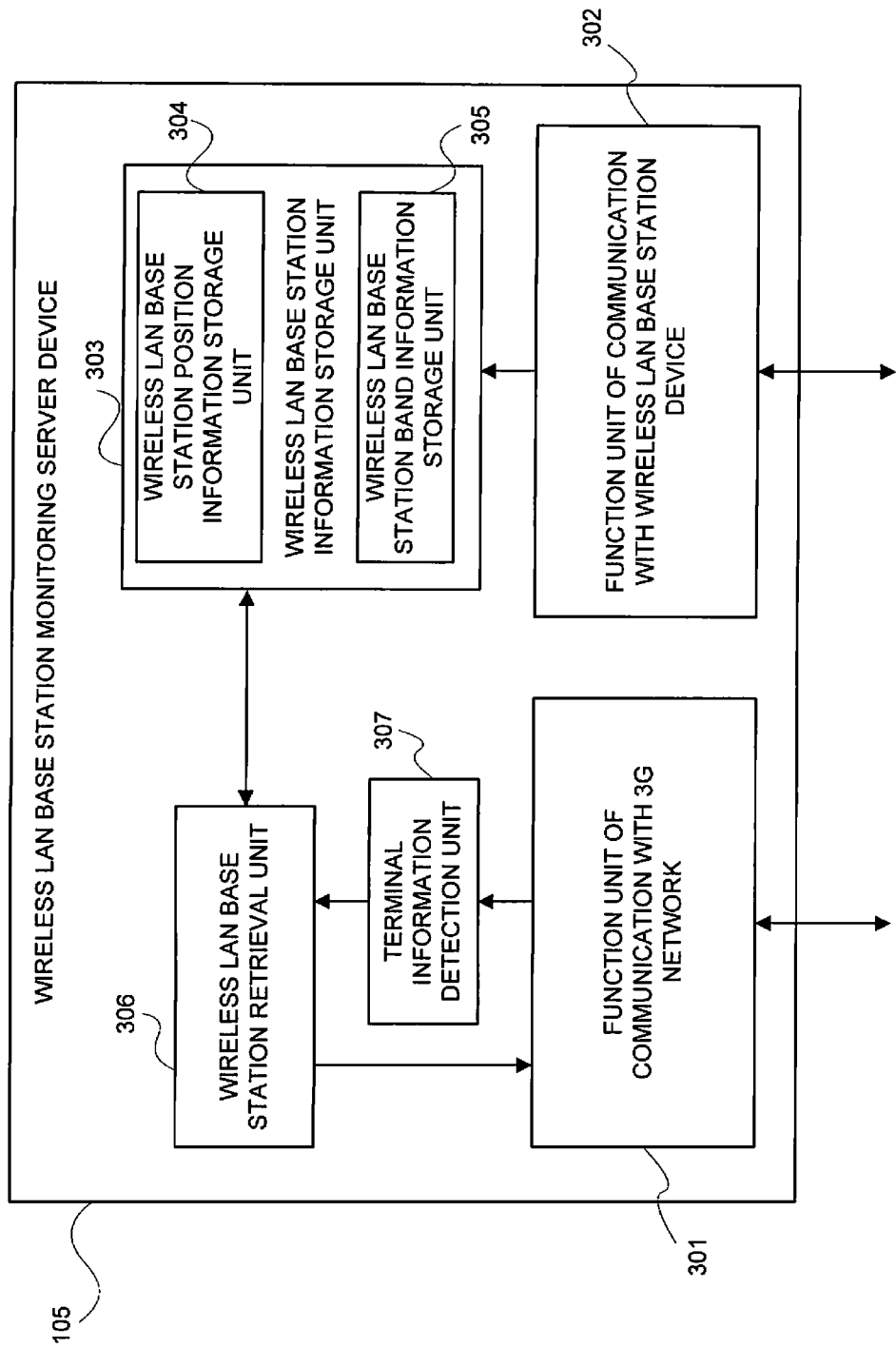
FIG. 3 is a view illustrating a configuration of a wireless LAN base station monitoring server device in the first embodiment of the present invention.

FIG. 3 is a view illustrating a configuration of the wireless LAN base station monitoring server device 105 relating to the present invention.

This wireless LAN base station monitoring server device 105 includes two function units as a communication function, i.e. a function unit 301 of communication with the 3G network 102 and a function unit 302 of communication with the wireless LAN base station device, a wireless LAN base station retrieval unit 306, a terminal position information detection unit 307, and a wireless LAN base station information storage unit 303 that is comprised of a wireless LAN base station position information storage unit 304 and a wireless LAN base station band information storage unit 305.

The wireless LAN base station monitoring server device 105 acquires the wireless LAN base station information, for example, the position information and the band occupation situation of the wireless LAN base station, the base station information necessary for a connection, or the like from the wireless LAN base station devices 107 to 109, which are being monitored by the wireless LAN base station monitoring server device 105, by employing the function unit 302 of communication with the wireless LAN base station devices 107 to 109 in FIG. 2, and stores it in the wireless LAN base station position information storage unit 304 and the wireless LAN base station band information storage unit 305 of the wireless LAN base station information storage unit 303. Additionally, the information being stored in the wireless LAN base station information storage unit is not limited to the position and the band information of the wireless LAN base station.

The terminal position information detection unit 307 detects the position information of the combined wireless terminal device 110 through the function unit 301 of communication with the 3G network from the combined wireless terminal device 110. The wireless LAN base station retrieval unit 306 acquires the position information of the combined wireless terminal device 110 from the terminal position information detection unit 307, compares the above information with the wireless LAN base station information acquired from the wireless LAN base station information storage unit 304, and retrieves the wireless LAN base station of the 3G cell 106 in the vicinity of the above combined wireless terminal device 110. And, the wireless LAN base station retrieval unit 306 notifies information as to whether or not the wireless LAN base station exists in the vicinity of the above combined wireless terminal device 110, and if it exists, information of the above wireless LAN base station, for example, the position, the band occupation situation, the base station information necessary for a connection, or the like to the combined wireless terminal device 110 through the internet 101. At that moment, communication between each of the wireless LAN base station devices 107 to 109 and the wireless LAN base station monitoring server device 105 is made via the internet 101, and the 3G network 102, the wireless LAN network 103, the wire network means, etc. are thinkable as an access network that is used at that moment. When communication is made by using the 3G network 102, the function unit 301 of communication with the 3G network and the function unit 302 of communication with the wireless LAN base station device become identical to each other. Additionally, herein, the internet 101 does not always need to be the so-called "The Internet", and the networks of other types such as an exclusive network line being provided by a communication enterpriser do not cause any problem. Further, the wireless LAN base station monitoring server device 105 as well is not always arranged at a position in which a connection to the internet 101 is made, but the wireless LAN base station monitoring server device 105 can be arranged also at a position in which a connection to the 3G network 102 or the wireless LAN network 103 is made.

<Explanation of the Combined Wireless Terminal Device 110>

Figure 4:
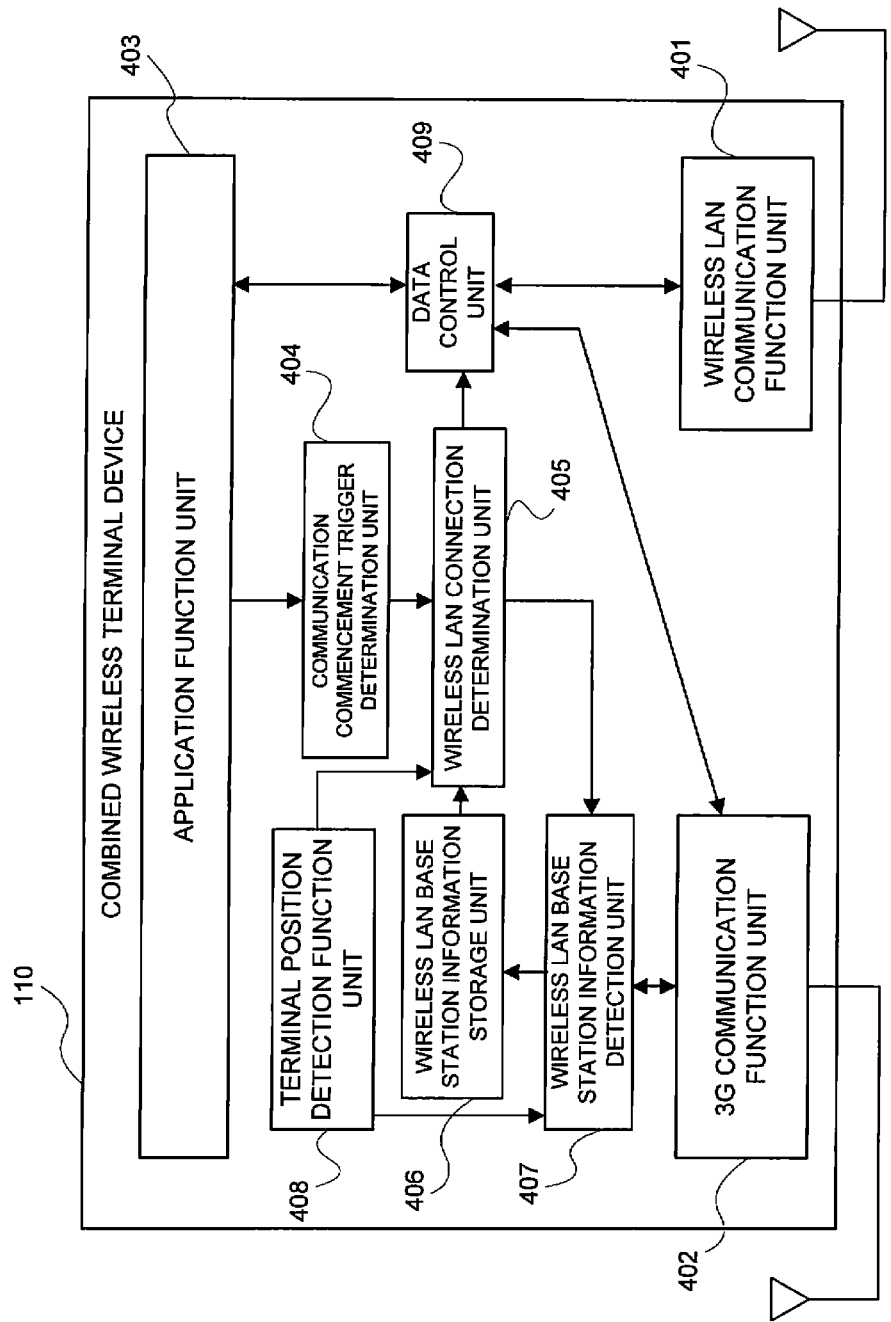
FIG. 4 is a view illustrating a configuration of a combined wireless terminal device in the first embodiment of the present invention.

FIG. 4 is a view illustrating a configuration of the combined wireless terminal device 110 relating to the present invention.

The combined wireless terminal device 110 includes a wireless LAN communication function unit 401 and a 3G communication function unit 402.

Further, the combined wireless terminal device 110 includes an application function unit 403. The so-called application function unit 403 in the present invention, which becomes an interface between a communication network and an end user or application software, is a function unit for inputting/outputting a reception/transmission packet, and signifies, for example, a web application and a voice application.

The combined wireless terminal device 110 includes a communication commencement trigger determination unit 404, a wireless LAN connection determination unit 405, a wireless LAN base station information storage unit 406, a wireless LAN base station information detection unit 407, and a terminal position detection function unit 408 as a function unit relating to selection of the communication network, and a data control unit 409 as a function unit for controlling data under communication.

The communication commencement trigger determination unit 404, upon receipt of information on a start etc. of the application relating to a communication commencement from the application function unit 403, determines the communication commencement.

The terminal position detection unit 408 detects a position of its own terminal. As a method of detecting a position of its own terminal, the method of acquiring GPS information, the method of specifying a position of its own terminal based upon information of the cell in which its own terminal is located, or the like is thinkable.

The wireless LAN connection determination unit 405, upon receipt of a communication commencement notification from the communication commencement trigger determination unit 404, requests of the wireless LAN base station information detection unit 407 acquisition of the wireless LAN base station information in order to determine the wireless LAN connection.

The wireless LAN base station information detection unit 407 having received the request acquires the position of its own terminal detected by the terminal position detection unit 408, and notifies this position information of its own terminal to the wireless LAN base station monitoring server device 105 of FIG. 3 mentioned above through the 3G communication function unit 402. On the other hand, the wireless LAN base station information detection unit 407 acquires the information of the wireless LAN base station information, for example, the position information of the wireless LAN base station, the band occupation situation, the base station information necessary for a connection, or the like from the wireless LAN base station monitoring server device 105 through the 3G communication function unit 402, and stores it in the wireless LAN base station information storage unit 406.

The wireless LAN connection determination unit 405 acquires the information from the wireless LAN base station information storage unit 406 and the terminal position detection function unit 408, and determines whether or not to select the wireless LAN as a communication network. Additionally, the required communication quality at which a connection to the wireless LAN is permitted may be pre-stored in the wireless LAN connection determination unit 405 to determine the connection based upon this required communication quality, and further, as described later, the communication quality may be tinged with the application being used (a web application or a voice application) and other elements to actively prepare the required communication quality and to determine the connection based upon this required communication quality.

After the wireless LAN connection determination unit 405 decides the communication network, it notifies its determination result to the data control unit 409.

After the data control unit 409, which is located between the application function unit 403 and the selected communication function unit, out of the communication function units 401 and 402, acquires the selected connection network from the wireless LAN connection determination unit 405, it receives/delivers the packet between the application function unit 403 and the selected communication function unit, which is accompanied with transmission/reception during communication. Herein, a frame having information necessary for controlling communication as data may be transmitted/received through the 3G network 102 at any time irrespective of the situation of the wireless LAN communication in the combined wireless terminal device 110.

<Explanation of an Operation>

The entirety of the operation by each device in the case that the wireless LAN network 103 is selected as an access network in this embodiment will be explained by making a reference to a configuration of the wireless communication control system of FIG. 1.

Each of the wireless LAN base station devices 107 that are being monitored by the wireless LAN base station monitoring server device 105 notifies the wireless LAN base station information of its own base station to the wireless LAN base station monitoring server device 105. Communication between each of the wireless LAN base station devices 107 to 109 and the wireless LAN base station monitoring server device 105 is made via the internet 101, and the 3G network 102, the wireless LAN network 103, the wire network, etc. are thinkable as an access network that is used at that moment.

Herein, the so-called wireless LAN base station information is information that becomes necessary when the combined wireless terminal device 110 is to set up a connection to the corresponding wireless LAN base station, for example, the position information of its own base station, the band occupation situation, or the like. In the standard specification 802.11 of the wireless LAN, the number of times of retransmission has been already specified for each terminal with regard to the band occupation information, and the above specification becomes an index for the communication situation of the wireless LAN base station. Further, in 802.11e, "Station Count", "Channel Utilization", and "Available Admission Capacity" have been specified with a parameter element that is called QBSS Load element.

The combined wireless terminal device 110, which is to commence communication, requests the wireless LAN base station information of the connectable wireless LAN base station device 107. At that moment, the combined wireless terminal device 110 may notify the position information of its own terminal to the wireless LAN base station monitoring server device 105 through the 3G base station 104, and further, the wireless LAN base station monitoring server device 105 can notify the wireless LAN base station information in the vicinity of the above combined wireless terminal device 110 to the above combined wireless terminal device 110 based upon its position information.

The wireless LAN base station monitoring server device 105 notifies information as to whether or not the connectable base station device exists, and if it exists, its wireless LAN base station information based upon the information obtained from the combined wireless terminal device 110 having requested the information through the 3G network 102. The combined wireless terminal device 110 having received the wireless LAN base station information decides whether or not to set up a connection to the wireless LAN network 103 from the wireless LAN base station information.

When it is estimated that the required communication quality cannot be secured even though the connectable wireless LAN base station exists judging from a high band occupation ratio, or the like, the combined wireless terminal device 110 selects the 3G network 102 without setting up a connection to the wireless LAN network 103. When the combined wireless terminal device 110 selects the wireless LAN network 103 as an access network, it starts the transmission/reception function of the wireless LAN. Thereafter, it reverts to the desired wireless LAN base station device 107, and commences the wireless LAN communication. At the moment that a series of the transmission/reception is finished, the combined wireless terminal device 110 cancels reversion to the wireless LAN base station device 107, cancels the start of the wireless LAN transmission/reception function, and returns to the normal communication of only the 3G network 102. Herein, the frame having information necessary for controlling communication as data may be transmitted/received through the 3G network 102 at any time irrespective of the situation of the wireless LAN communication in the combined wireless terminal device 110.

Next, an operation inside the combined wireless terminal device 110 ranging from the detection of a trigger for commencing communication to the selection of the connection network and the communication commencement will be explained in details by making a reference to a configuration view of the combined wireless terminal device 110 of FIG. 4.

At first, the communication commencement trigger determination unit 404 detects the trigger for commencing communication from the application function unit 403. The communication commencement trigger determination unit 404 notifies the communication commencement to the wireless LAN connection determination unit 405.

The wireless LAN base station information detection unit 407 acquires the connectable wireless LAN base station information through the 3G communication function unit 402, and stores it in the wireless LAN base station information storage unit 406. At that time, the terminal position detection unit 408 may detect a position of its own terminal to notify its position information to the wireless LAN base station information detection unit 407, and to acquire information of only the wireless LAN base station device, which is located in the vicinity, from the position of its own terminal.

Continuously, the wireless LAN connection determination unit 405 acquires the above information from the wireless LAN base station information storage unit 406, and determines whether or not to set up a connection to the wireless LAN network 103. The decided connection network is notified to the data control unit 409.

When the combined wireless terminal device 110 has selected the wireless LAN network 103, herein, it starts the wireless LAN transmission/reception function. The application function unit 403 does not directly receive/deliver the packet from/to the wireless LAN communication function unit 401 during communication, but the data control unit 409 transmits/receives the packet via the wireless LAN communication function unit.

When the wireless LAN network 103 has not been selected as an access network, the data control unit 409 transmits/receives the frame via the 3G communication function unit 402.

Additionally, in the foregoing explanation, the combined wireless terminal device 110 decided the access network by taking the wireless LAN base station information and the terminal position information as a determination material. However, the combined wireless terminal device 110 notifies the required communication quality and the terminal position information to the wireless LAN base station monitoring server device 105 through the 3G communication function unit 402, and thereby, the wireless LAN base station monitoring server device 105 may bear one part of the function of selecting the access network to which the corresponding combined wireless terminal device 110 sets up a connection from the wireless LAN base station information and the terminal position information.

As mentioned above, this embodiment makes it possible to obtain the connectable wireless LAN base station information through the 3G network 102 instead of the scan connected to the wireless LAN network 103 selected prior to communication, and to suppress the consumption power due to the scan connected to the wireless LAN communication. Further, when the connectable wireless LAN base station does not exist, or when there is no vacancy in the band even though it exists, the combined wireless terminal device 110 makes communication by employing the 3G network 102. Thus, taking the wireless LAN as an access network only on the condition that the connectable wireless LAN base station exists and yet there is a sufficient vacancy in the band makes it possible to suppress the consumption power due to the wireless LAN communication during communication to a minimum level. The wasteful consumption power at the time of the start can be suppressed because the start of the wireless LAN transceiver is cancelled when a series of the communication is finished.

EXAMPLE 1

Next, the example 1 of the present invention will be explained by making a reference to the accompanied drawings. This example 1 corresponds to the foregoing first embodiment.

Figure 5:
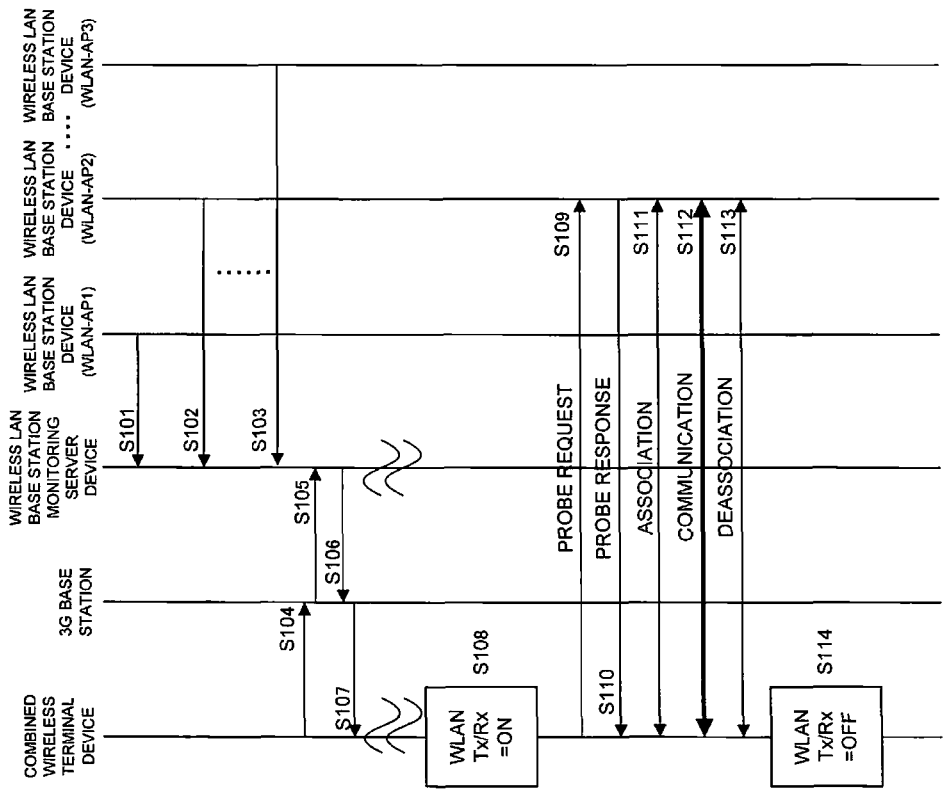
FIG. 5 is a sequence diagram illustrating an operation of the first embodiment of the present invention.

FIG. 5 is a sequence block of an entire operation of each device ranging from the selection of the wireless LAN network 103 upon receipt of a trigger for commencing communication to the finishing of the communication.

Each of the wireless LAN base station devices 107 to 109 that are being monitored by the wireless LAN base station monitoring server device 105 notifies the wireless LAN base station information of its own base station to the wireless LAN base station monitoring server device 105 (S101 to S103). At that moment, communication between each of the wireless LAN base station devices 107 to 109 and the wireless LAN base station monitoring server device 105 is made via the internet 101, and the access network that is used at that moment could be the 3G network 102, the wireless LAN network 103, the wire network, or the like.

The combined wireless terminal device 110, which is to commence communication, notifies the position information of its own terminal to the wireless LAN base station monitoring server device 105 through the 3G base station device 104, and requests the wireless LAN base station information of the connectable wireless LAN base station device that is located in the vicinity of the above combined wireless terminal device 110 (S104 to S105).

The wireless LAN base station monitoring server device 105 notifies information as to whether or not the connectable base station device exists, and if it exists, its wireless LAN base station information based upon the information obtained from the combined wireless terminal device 110 having requested the information to the combined wireless terminal device 110 through the 3G network 102 (S106 and S107). Herein, the wireless LAN base station information being notified is a position of the wireless LAN base station, a band occupation situation of the above wireless LAN base station, and base station information for necessary for a connection. As a band occupation situation, there exist an average number of times of re-transmission, QBSS Load (Station Count, Channel Utilization, a residual quantity of Medium Time), etc.

The combined wireless terminal device 110 having received the wireless LAN base station information decides whether or not to set up a connection to the wireless LAN from the wireless LAN base station information. When it is estimated that the required communication quality cannot be secured even though the connectable wireless LAN base station exists judging from the band occupation situation, the combined wireless terminal device 110 selects to make communication using the 3G network 102 without setting up a connection to the wireless LAN network 103. With regard to determination of the connection based upon the band occupation situation, for example, when the information of the band occupation situation is an average number of times of re-transmission, the combined wireless terminal device 110 determines that a medium is stable if the number of times of re-transmission is three or less and decides a connection to the wireless LAN because a default value thereof is seven. Further, in the case that the information of the band occupation situation is "Station Count" and the connection specification of the wireless LAN is IEEE 802.11b, a connection to the wireless LAN is decided when the number of the connected terminals is five or less. Further, in the case that the information of the band occupation situation is "Station Count" and the connection specification of the wireless LAN is IEEE 802.11g, a connection to the wireless LAN is decided when the number of the connected terminals is 15 or less. Further, in the case that the information of the band occupation situation is "Channel Utilization", a connection to the wireless LAN is decided when it is 50% or less.

The combined wireless terminal device 110 having selected the wireless LAN network 103 as an access network starts the transmission/reception function of the wireless LAN (S108).

Thereafter, the combined wireless terminal device 110 detects the desired wireless LAN base station device 107 after transmission of a "Probe request" frame and reception of the "Probe request" frame (S109 and S110), and commence the wireless LAN communication (S111 and S112).

At the moment that a series of the transmission/reception is finished, the combined wireless terminal device 110 cancels reversion to the wireless LAN base station (number) by transmitting/receiving a "DeAssociation" frame (S113), cancels the start of the wireless LAN transmission/reception function (S114), and returns to the normal communication of only the 3G network 102. Herein, the communication associated with information necessary for controlling communication may be made at any time through the 3G network 102 irrespective of the situation of the wireless LAN communication in the combined wireless terminal device 110.

Figure 6:
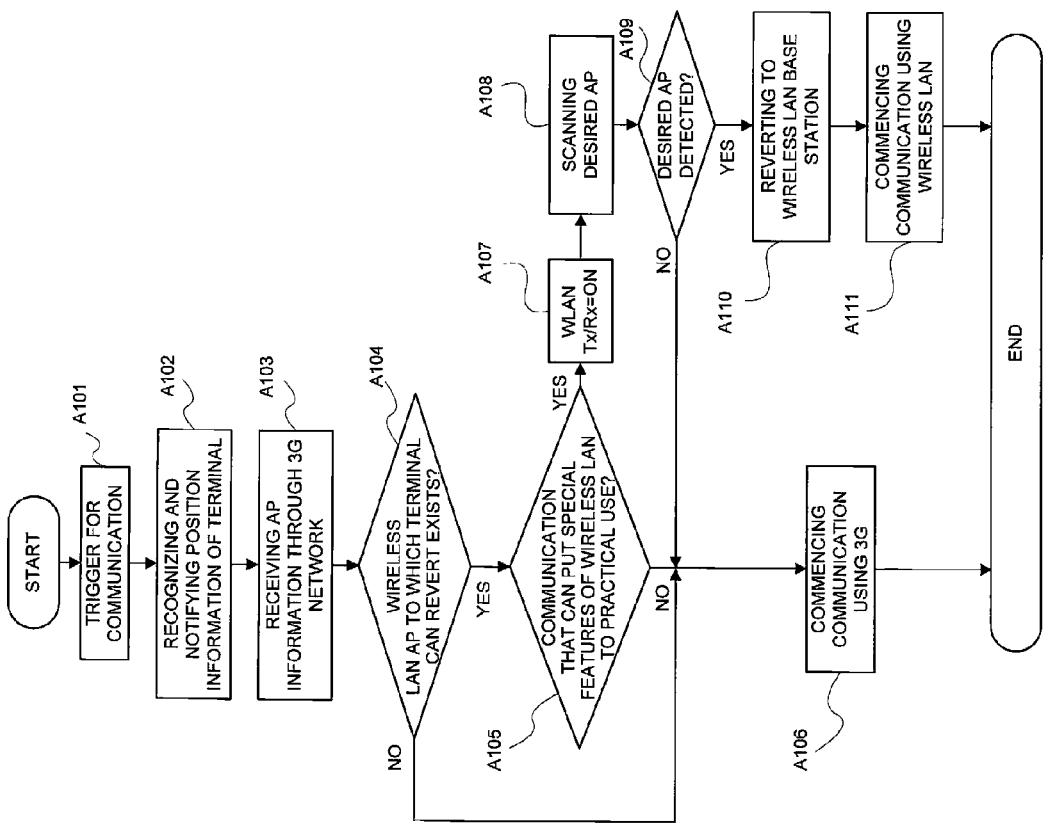
FIG. 6 is a flowchart illustrating an operation of the combined wireless terminal at the moment of selecting an access network and commencing communication, out of operations in the first embodiment of the present invention.

Next, an operation that the combined wireless terminal device 110 of this example 1 selects the access network, and commence communication will be explained in details by making a reference to a flowchart of FIG. 6 and a configuration view of the combined wireless terminal device 110 of FIG. 4. FIG. 6 is a flowchart illustrating an operation of the combined wireless terminal device 110 ranging from the trigger for commencing communication and the determination for selecting the access network being made at that moment to the communication commencement.

At first, the combined wireless terminal device 110 commences a procedure for selecting the communication network with a start of the application by a user taken as a trigger for commencing communication (step A101). And, the combined wireless terminal device 110 acquires position information of its own terminal, and notifies this position information of its own terminal to the wireless LAN base station monitoring server device 105 through the 3G network 102

(step A102). And, the combined wireless terminal device 110 receives the information of the connectable wireless LAN base station, for example, the band occupation situation, the base station information necessary for a connection, or the like (step A103). The band information, out of pieces of the wireless LAN base station information being received herein, is the number of times of re-transmission addressed to each terminal device, the number of reversion terminals, or the like, and there is no limit to the band information so long as it is a parameter associated with the band control.

Next, the combined wireless terminal device 110 determines whether the wireless LAN base station to which it is connectable exists from the information of the wireless LAN base stations to which it can revert, out of the wireless LAN base station information (step A104).

The combined wireless terminal device 110 makes communication using the 3G network 102 without selecting the wireless LAN network 103 as a connection network when the wireless LAN base station to which it can revert does not exist (step A106).

On the other hand, the combined wireless terminal device 110 determines whether special features of the wireless LAN can be put to practical use from the band information etc. when the wireless LAN base station to which it can revert exists (step A105). For example, the quality cannot be secured when the band occupation ratio is high even though the connectable wireless LAN base station exists, so the combined wireless terminal device 110 selects a connection to the 3G network 102 without setting up a connection to the wireless LAN network 103, and when it can be predicted that the communication quality can be secured because the band occupation ratio is low, the combined wireless terminal device 110 selects a connection to the wireless LAN network 103.

When the combined wireless terminal device 110 has selected communication using the wireless LAN, it starts the transmission/reception function of the wireless LAN communication that has not been started so far (step A107), and after detecting/reverting to the connectable wireless LAN base station pre-notified from the wireless LAN base station monitoring server device 105 (step A108 to step A110), it makes communication with the wireless LAN network 103 taken as an access network (step A111). Herein, the frame having information necessary for controlling communication as data may be transmitted/received through the 3G network 102 at any time irrespective of the situation of the wireless LAN communication in the combined wireless terminal device 110.

Figure 7:
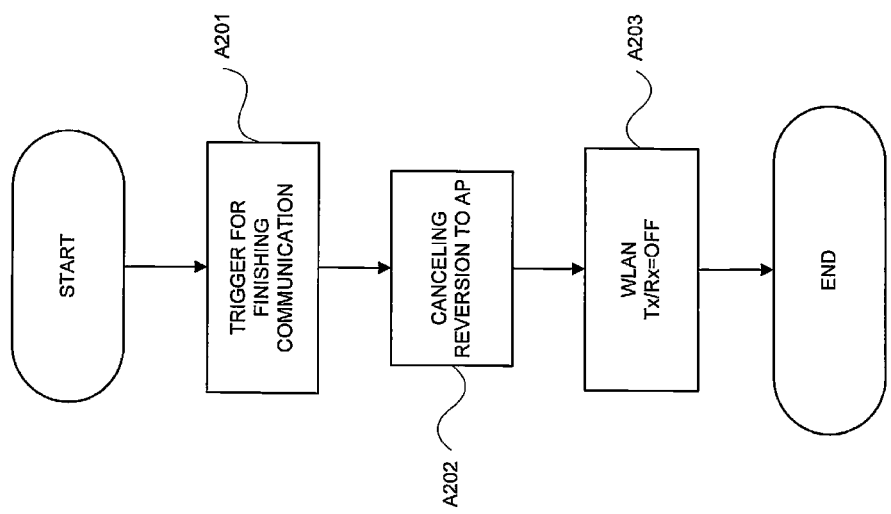
FIG. 7 is a flowchart illustrating an operation of the combined wireless terminal at the moment of finishing communication, out of operations in the first embodiment of the present invention.

In addition hereto, an operation of the combined wireless terminal device 110 at the time of finishing communication will be explained by employing FIG. 7.

The combined wireless terminal device 110, upon receipt of a trigger for finishing communication from the application function unit 403 (step A201), cancels reversion to the wireless LAN base station device 107 (step A202), and cancels the start of the wireless LAN transmission/reception function (step A203).

Figure 8:
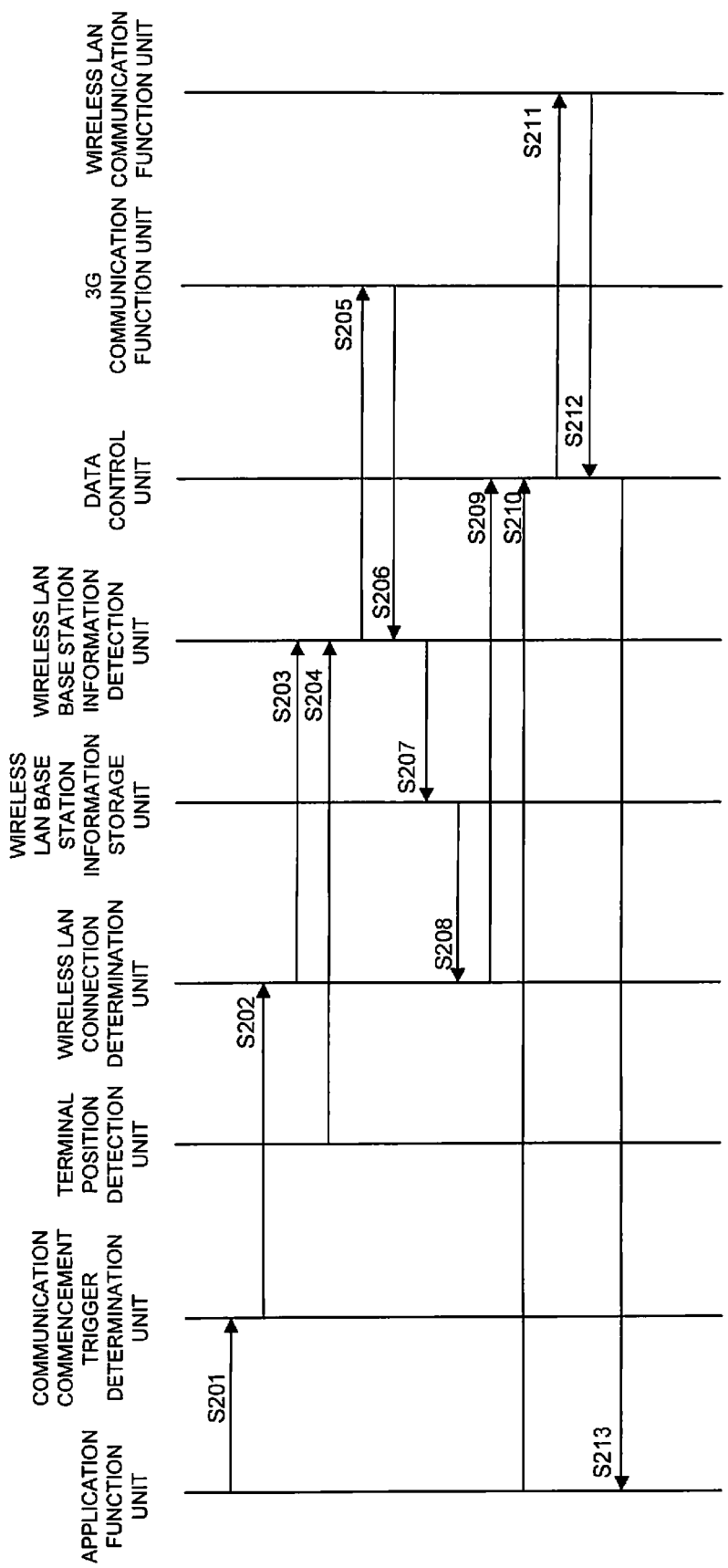
FIG. 8 is a sequence diagram illustrating an operation within the combined wireless terminal device of the first embodiment of the present invention.

Herein, an operation of the combined wireless terminal device 110 ranging from the trigger for commencing communication to the selection of the connection network and to the communication commencement will be explained in details. FIG. 8, which is a sequence block of an operation inside the combined wireless terminal device 110 ranging from the trigger for commencing communication to the selection of the connection network and to the communication commencement, illustrates the case that the wireless LAN network 103 has been selected as an access network.

At first, the application function unit 403 notifies the trigger for commencing communication to the communication commencement trigger determination unit 404 (S201).

The communication commencement trigger determination unit 404 notifies the communication commencement to the wireless LAN connection determination unit 405 (S202).

The wireless LAN connection determination unit 405 requests of the wireless LAN base station information detection unit 407 acquisition of the wireless LAN base station information in order to determine whether or not to set up a connection to the wireless LAN (S203).

The terminal position detection unit 408 detects a position of its own terminal and notifies its position information to the wireless LAN base station information detection unit 407 (S204).

The wireless LAN base station information detection unit 407 notifies the position information coming from the terminal position detection unit 408 to the wireless LAN base station monitoring server device 105 through the 3G communication function unit 402 (S205).

Further, the wireless LAN base station information detection unit 407 acquires the connectable wireless LAN base station information from the wireless LAN base station monitoring server device 105 through the 3G communication function unit 402 (S206), and stores it in the wireless LAN base station information storage unit 406 (S207).

The wireless LAN connection determination unit 405 acquires the above information from the wireless LAN base station information storage unit 406 (S208), and determines whether or not to set up a connection to the wireless LAN network 103. A determination result is notified to the data control unit 409 (S209).

Herein, when the wireless LAN communication has been selected, the combined wireless terminal device 110 starts the wireless LAN transmission/reception function. At the moment of transmission, the application function unit 403 delivers the packet to the data control unit 409 without directly delivering it to the wireless LAN communication function unit 401 (S210), and the data control unit 409 transmits it to the wireless LAN communication function unit 401 (S211). At the moment of reception, the data control unit 409 receives the packet from the wireless LAN communication function unit 401 (S212), and the data control unit 409 delivers the packet to the application function unit 403 (S213).

On the other hand, when the wireless LAN network 103 has not been selected as an access network, the data control unit 409 transmits/receives the frame via the 3G communication function unit 402. Herein, the communication associated with information necessary for controlling communication may be transmitted/received through the 3G network 102 at any time irrespective of the situation of the wireless LAN communication in the combined wireless terminal device 110.

A second embodiment will be explained.

The second embodiment is an embodiment having a point added of making a determination by employing application information besides the wireless LAN base station information that is employed when the combined wireless terminal device 110 in the foregoing first embodiment selects the communication network.

Figure 9:
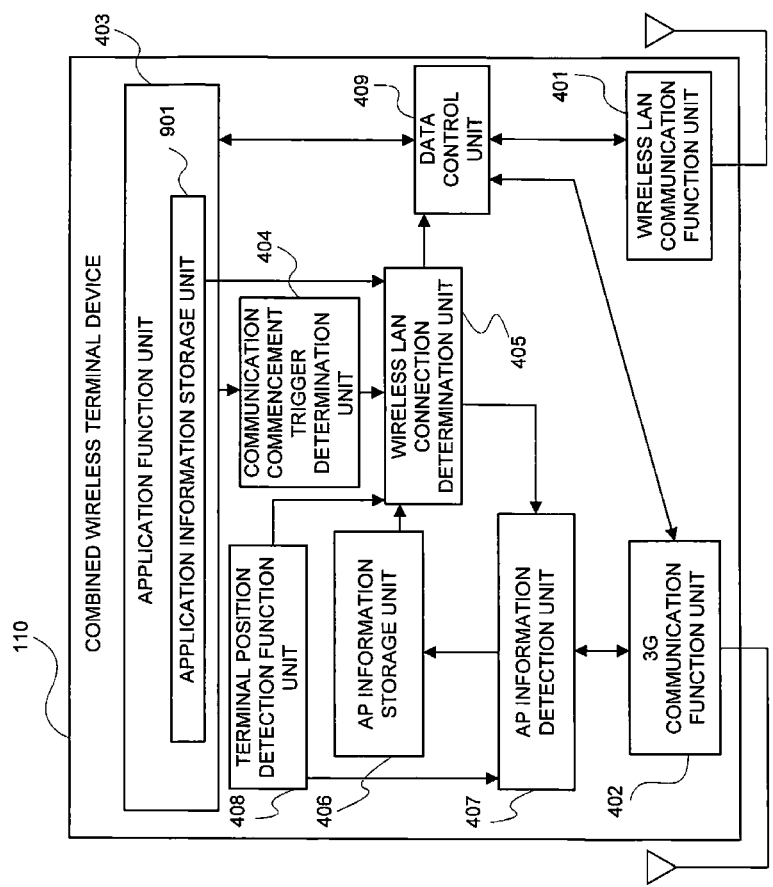
FIG. 9 is a view illustrating a configuration of the combined wireless terminal device of a second embodiment of the present invention.

FIG. 9 illustrates the combined wireless terminal device 110 in the second embodiment. Upon making a reference to FIG. 9, the combined wireless terminal device 110 of the second embodiment differs from that of the first embodiment shown in FIG. 4 in a point of including an application information storage unit 901.

The application function unit 403 in this embodiment, at the time of starting the application, stores its application information in the application information storage unit 901. Herein, as the so-called application information, for example, an application classification and a communication packet capacity can be listed. The wireless LAN connection determination unit 405, at the moment of determining whether or not to select the wireless LAN network 103 as an access network, acquires the application information from the application information storage unit 901 in addition to the wireless LAN base station information in the first embodiment.

Next, a point in which the second embodiment differs from the first embodiment, out of operations inside the combined wireless terminal device 110 relating to the selection of the connection network, will be explained in details.

A first, the communication commencement trigger determination unit 404 detects the trigger for commencing communication from the application function unit 403. And, when the communication commencement trigger determination unit 404 detects the trigger, it notifies the communication commencement to the wireless LAN connection determination unit 405.

The wireless LAN base station information detection unit 407 acquires the connectable wireless LAN base station information through the 3G communication function unit 402, and stores it in the wireless LAN base station information storage unit 406. At that time, the terminal position detection unit 408 may detect a position of its own terminal to notify its position information to the wireless LAN base station information detection unit 407, and to acquire information of only the wireless LAN base station device, which is located in the vicinity, from the position of its own terminal.

On the other hand, the application function unit 403 stores the application information in the application information storage unit 901. This information is notified to the wireless LAN connection determination unit 405 by the application information storage unit 901.

Similarly to the first embodiment, the wireless LAN connection determination unit 405 acquires the wireless LAN base station information from the wireless LAN base station information storage unit 406 as a criterion for determining whether or not to select the wireless LAN network 103 as access network. In addition hereto, the wireless LAN connection determination unit 405 in this embodiment determines whether or not to select the wireless LAN network 103 as an access network at the moment of making communication by the above application from the notified application information and wireless LAN base station information. When the special features of the wireless LAN can be put to practical use, for example, when the wireless LAN base station, which enables the required quality to be secured, exits judging from the application information, the wireless LAN connection determination unit 405 selects the wireless LAN network 103 as an access network. On the other hand, when the special features of the wireless LAN cannot be put to practical use, the wireless LAN connection determination unit 405 selects the 3G network 102 as an access network.

Additionally, herein, the combined wireless terminal device 110 decided the access network by taking the wireless LAN base station information, the application information, and the terminal position information as a determination material. However, the combined wireless terminal device 110 notifies the required communication quality, the application information, and the terminal position information to the wireless LAN base station monitoring server device 105 through the 3G communication function unit 402, and thereby, the wireless LAN base station monitoring server device 105 may bear one part of the function of selecting the access network to which the corresponding combined wireless terminal device 110 sets up a connection from the wireless LAN base station information, the application information, and the terminal position information.

Further, the application information differs application by application, so the similar procedure is performed also in the case that another application is started, and another communication is commenced during communication. Thus, a status in which a connection to the 3G network 102 and a connection to the wireless LAN network 103 are simultaneously set up could occur.

In addition hereto, the communication associated with information necessary for controlling communication may be made through the 3G network 102 at any time irrespective of the situation of the wireless LAN communication in the combined wireless terminal device 110. At the moment that the communication corresponding to all applications is finished, the combined wireless terminal device 110 cancels the start of the wireless LAN transmission/reception function, and returns to the normal communication using only the 3G network 102.

In such a manner, in the second embodiment, additionally taking the application information besides the connectable wireless LAN base station device information as a material for selecting the determination makes it possible to appropriately determine the connection network, and to suppress the communication using the wireless LAN to a minimum level, and an effect of saving the power during communication can be expected.

Further, it becomes also possible to make the determination that the selection of making communication using the wireless LAN is not taken only form the application information, and in this case, the consumption power due to the wireless LAN base station scan can be also curtailed because the wireless LAN base station scan carried out in the first embodiment does not need to be carried out in this embodiment.

EXAMPLE 2

The example 2 of the present invention will be explained by making a reference to the accompanied drawings. This example 2 corresponds to the second embodiment.

Figure 10:
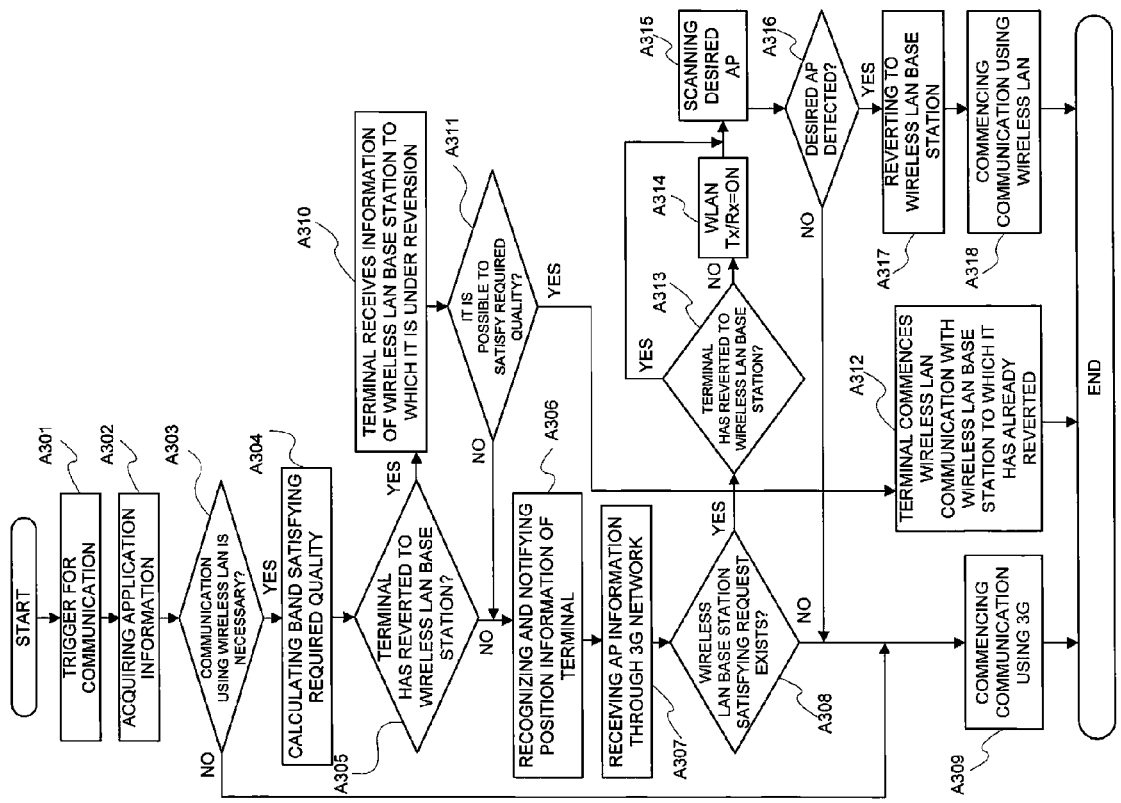
FIG. 10 is a flowchart illustrating an operation of the combined wireless terminal at the moment of selecting an access network and commencing communication, out of operations in the second embodiment of the present invention

An operation that the combined wireless terminal device 110 of this example selects the access network, and commences communication will be explained in details by making a reference to a flowchart of FIG. 10 and a configuration view of the combined wireless terminal device 110 of FIG. 9. The flowchart of FIG. 10 illustrates an operation of the combined wireless terminal device 110 ranging from the trigger for commencing communication and the determination for selecting the access network being made at that moment to the communication commencement.

At first, the combined wireless terminal device 110 receives the trigger for commencing communication from the application function unit 403 (step A301). With it, the wireless LAN connection determination unit 405 acquires the application information accompanied with communication from the application storage unit 901 (step A302), and determines whether or not the communication using the wireless LAN is necessary for the above application information (step A303). For example, the case that the combined wireless terminal device 110 does not make communication using the wireless LAN of which the burden is large when the packet size is small, the case that the combined wireless terminal device 110 makes the communication using the wireless LAN only for a specific application, or the like is thinkable. When the combined wireless terminal device 110 does not make the communication using the wireless LAN, it makes the communication via the 3G network without scanning the wireless LAN base station (step A309).

Further, the combined wireless terminal device 110 determines that the communication connected to the wireless LAN network 103 is required in the case that the packet size is large, or in the case that the application is such an application of which the communication cost in the 3G network 102 is high. When the combined wireless terminal device 110 selects the wireless LAN, it computes a value that corresponds to the band occupation that becomes necessary from the above application information (step A304). And, at that time, when the combined wireless terminal device 110 has already set up a connection to the wireless LAN network 103 in the communication that corresponds to another application information, it acquires the wireless LAN base station information of the wireless LAN base station to which it has already reverted, and determines whether the communication satisfying the request can be made (step A305, A310, and A311).

For example, in the case that the application classification is a voice application, an increase in the number of times of re-transmission becomes a factor of deterioration in the voice quality because real-time operability is required. For this, a threshold for the number of times of re-transmission is established, and the communication using the wireless LAN network 103 is made when the wireless LAN base station device of which the number of times of re-transmission is equal to or less than the threshold exists. As an example, the wireless LAN network 103 is selected when the number of times of re-transmission is two or less. On the other hand, in the case that the application classification is an application such as a Web application, the wireless LAN network 103 is selected when the number of times of re-transmission is four or less.

Further, in the case that the application classification is a voice application, the information of the band occupation situation is "Station Count", and the connection specification of the wireless LAN is IEEE802.11b, a connection to the wireless LAN is decided when the number of the connected terminals is five or less. On the other hand, in the case that the application classification is a Web application, the information of the band occupation situation is "Station Count", and the connection specification of the wireless LAN is IEEE802.11b, a connection to the wireless LAN is decided when the number of the connected terminals is seven or less.

Further, in the case that the application classification is a voice application, the information of the band occupation situation is "Station Count", and the connection specification of the wireless LAN is IEEE802.11g, a connection to the wireless LAN is decided when the number of the connected terminals is 15 or less. On the other hand, in the case that the application classification is a Web application, the information of the band occupation situation is "Station Count", and the connection specification of the wireless LAN is IEEE802.11g, a connection to the wireless LAN is decided when the number of the connected terminals is 20 or less.

Further, in the case that the information of the band occupation situation is "Channel Utilization" and the application classification is a voice application, a connection to the wireless LAN is decided when the "Channel Utilization" is 50% or less, and in the case that the application classification is a Web application, a connection to the wireless LAN is decided when the "Channel Utilization" is 60% or less.

As another example, a usage method is thinkable in which a threshold of a capacity of the communication packet is established, and the communication using the wireless LAN is selected only when the size of the packet that is scheduled to be communicated is equal to or more than the threshold, and yet the wireless LAN base station of which the band situation can bear the required size exists. The combined wireless terminal device 110 makes communication corresponding to the above application information via the wireless LAN base station to which it is under reversion when the information of the wireless LAN base station to which it is under reversion satisfies the request (A312).

The combined wireless terminal device 110 acquires the wireless LAN base station information from the wireless LAN base station monitoring server device 105 through the 3G network 102 when it is determined that the request is not satisfied from the wireless LAN base station information of the wireless LAN base station to which it is under reversion (step A307). Herein, the combined wireless terminal device 110 may detect the position information of its own terminal to notify it to the wireless LAN base station monitoring server device 105 (step A306).

The combined wireless terminal device 110, similarly to the case of the example 1, detects/reverts to the desired wireless LAN base station, and commences the communication using the wireless LAN that corresponds to the above application information (A313 to A318) when it is determined that the wireless LAN base station satisfying the request exists from the acquired wireless LAN base station information (A308).

Figure 11:
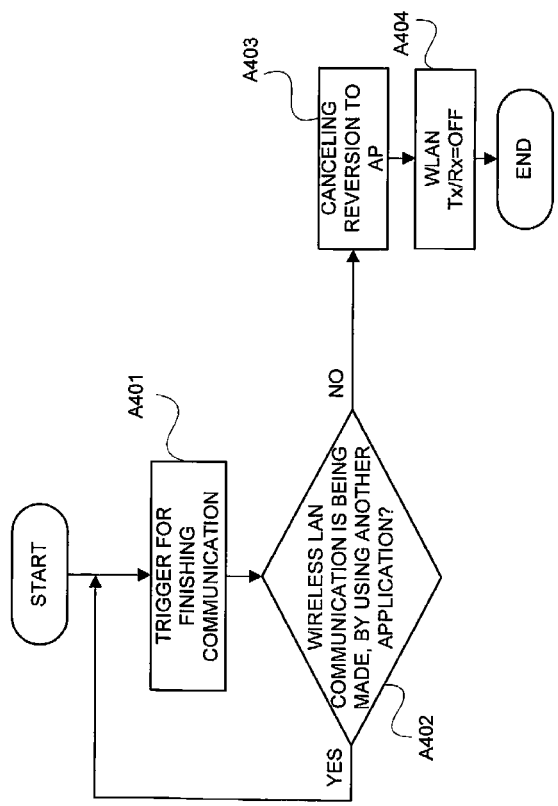
FIG. 11 is a flowchart illustrating an operation of the combined wireless terminal at the moment of finishing communication, out of operations in the second embodiment of the present invention.

Next, an operation at the moment that the combined wireless terminal device 110 having set up a connection to the wireless LAN network finishes the communication will be explained by employing a flowchart of FIG. 11.

The combined wireless terminal device 110, upon receipt of the trigger for finishing communication from the application function unit 403 (step A401), cancels reversion to the wireless LAN base station device 107 (step A403), and cancels the start of the wireless LAN transmission/reception function (step A404) when the communication corresponding to another application information is not being made in the wireless LAN (step A402).

On the other hand, when the communication corresponding to another application information is being made by the wireless LAN, the combined wireless terminal device 110 waits the trigger for finishing the communication that corresponds to the application information under communication, without canceling reversion to the wireless LAN base station to which it is under reversion.

A third embodiment of the present invention will be explained.

The third embodiment is an embodiment having a point added of making a determination by employing a residual quantity of an electric cell besides the wireless LAN base station information that is employed when the combined wireless terminal device 110 in the foregoing first and second embodiments selects the communication network.

Figure 12:
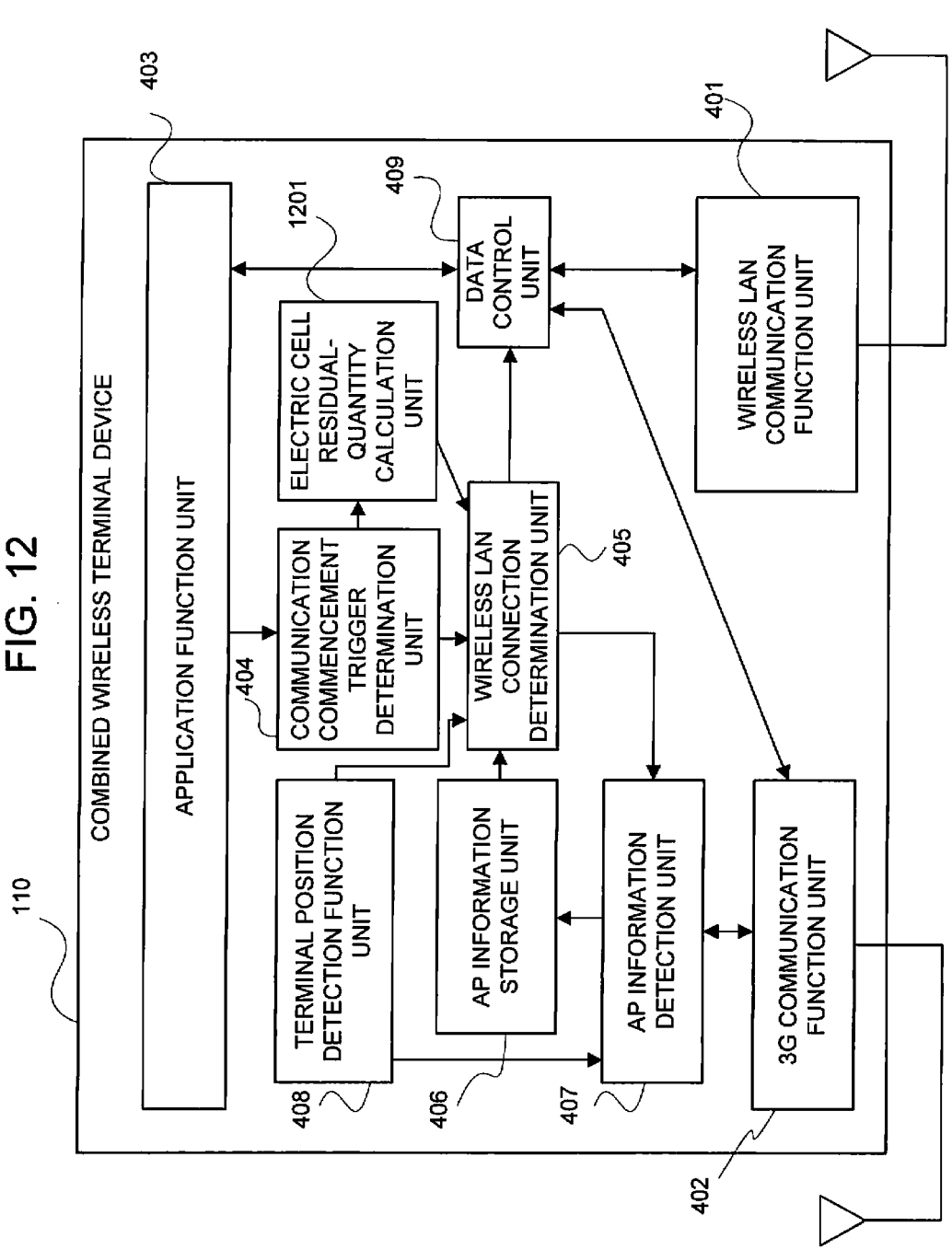
FIG. 12 is a view illustrating a configuration of the combined wireless terminal device of a third embodiment of the present invention.

Upon making a reference to FIG. 12, the combined wireless terminal device 110 of the third embodiment differs from that of the first embodiment shown in FIG. 4 in a point of including an electric cell residual-quantity calculation unit 1201.

The electric cell residual-quantity calculation unit 1201 calculates a residual quantity of an electric cell of its own terminal, and notifies it to the wireless LAN connection determination unit 405. Not only the communication commencement trigger determination unit 404 but also the wireless LAN connection determination unit 405 may notify a timing at which the residual quantity of the electric cell is calculated to the electric cell residual-quantity calculation unit 1201. In FIG. 12, the communication commencement trigger determination unit 404 notifies it. The wireless LAN connection determination unit 405 takes the wireless LAN base station information as a determination material similarly to the case of the first embodiment, and takes the residual quantity of the electric cell as well additionally as a determination material, thereby to determine whether or not to select the wireless LAN network 103 as an access network.

Next, an operation of the third embodiment will be explained. Additionally, in the following explanation of operations, a point in which the third embodiment differs from the first embodiment, out of operations inside the combined wireless terminal device 110 relating to the selection of the connection network, will be explained in details with it at a center.

At first, the communication commencement trigger determination unit 404 detects the trigger for commencing communication from the application function unit 403. The communication commencement trigger determination unit 404 notifies the communication commencement to the wireless LAN connection determination unit 405.

The wireless LAN base station information detection unit 407 acquires the connectable wireless LAN base station information through the 3G communication function unit 402, and stores it in the wireless LAN base station information storage unit 406. At that time, the terminal position detection unit 408 may detect a position of its own terminal to notify its position information to the wireless LAN base station information detection unit 407, and to acquire information of only the wireless LAN base station device, which is located in the vicinity, from the position of its own terminal.

The electric cell residual-quantity calculation unit 1201 having received the communication commencement notification calculates the residual quantity of the electric cell of its own terminal, and notifies its value to the wireless LAN connection determination unit 405.

The wireless LAN connection determination unit 405, similarly to the case of the first embodiment, acquires the wireless LAN base station information from the wireless LAN base station information storage unit 406 as a criterion for determining whether or not to select the wireless LAN network 103 as an access network. And, the wireless LAN connection determination unit 405 determines whether or not to select the wireless LAN network 103 as an access network by taking the residual quantity of the electric cell besides the wireless LAN base station information into consideration, and selects the wireless LAN network 103 as an access network only in the case of the residual quantity of the electric cell that can bear the wireless LAN communication.

Additionally, herein, the combined wireless terminal device 110 decided the access network by taking the wireless LAN base station information, the electric cell residual-quantity, and the terminal position information as a determination material. However, the combined wireless terminal device 110 notifies the required communication quality, the residual quantity of the electric cell, and the terminal position information to the wireless LAN base station monitoring server device 105 through the 3G communication function unit 402, and thereby, the wireless LAN base station monitoring server device 105 may bear one part of the function of selecting the access network to which the corresponding combined wireless terminal device 110 sets up a connection from the wireless LAN base station information, the residual quantity of the electric cell, and the terminal position information.

Further, an operation ranging from the selection of the connection network to the finishing of the communication is similar to that of the first embodiment. Herein, the communication associated with information necessary for controlling communication may be made through the 3G network 102 at any time irrespective of the situation of the wireless LAN communication in the combined wireless terminal device 110.

As mentioned above, in the third embodiment, additionally taking the residual quantity of the electric cell besides the connectable wireless LAN base station device information as a material for determining selection of the access network makes it possible to avoid running-out of a battery during communication.

EXAMPLE 3

The example 3 will be explained by making a reference to the accompanied drawings. The example 3 corresponds to the third embodiment.

Figure 13:
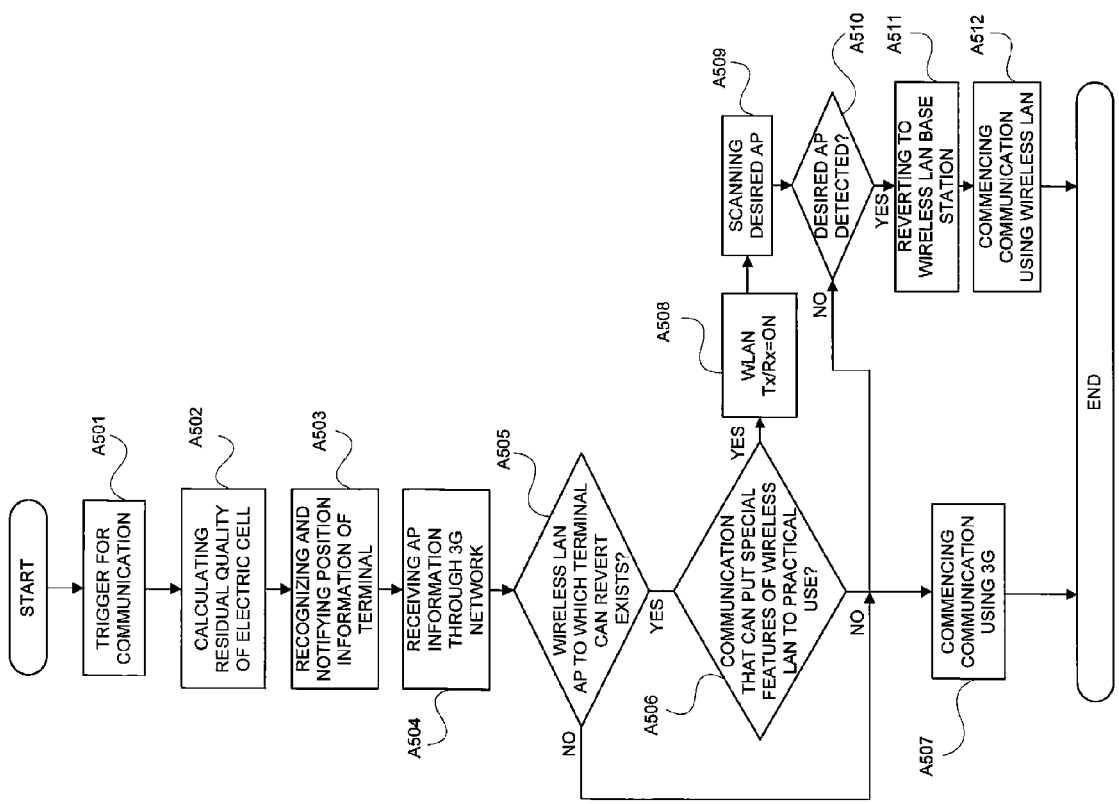
FIG. 13 is a flowchart illustrating an operation of the combined wireless terminal at the moment of selecting an access network and commencing communication, out of operations in the third embodiment of the present invention.

With regard to an operation that the combined wireless terminal device 110 of this example selects the access network, and commences communication, a point in which the example 3 differs from the example 1 will be explained in details by making a reference to a flowchart of FIG. 13 and a configuration view of the combined wireless terminal device 110 of FIG. 12. FIG. 13 is a flowchart of an operation of the combined wireless terminal device 110 ranging from the acquisition of the trigger for commencing communication to the determination for selecting the access network and the communication commencement.

At first, the combined wireless terminal device 110 receives the trigger for commencing communication from the application function unit 403 (step A501). With it, the combined wireless terminal device 110 calculates the residual quantity of the electric cell in the electric cell residual-quantity calculation unit 1201 (step A502). And, the combined wireless terminal device 110 recognizes the position information of its own terminal, notifies it to the wireless LAN base station monitoring server device 105 through the 3G network 102, and receives the information of the connectable wireless LAN base station, for example, the band occupation situation, the base station information necessary for a connection, or the like (step A503 and step A504).

Next, the combined wireless terminal device 110 determines whether the wireless LAN base station to which it is connectable exists from the information of the wireless LAN base stations to which it can revert, out of the wireless LAN base station information (step A505). The combined wireless terminal device 110 makes the communication by using the 3G network 102 without selecting the wireless LAN network 103 as a connection network when the revertable wireless LAN base station does not exist (step A507).

The combined wireless terminal device 110 determines whether the special features of the wireless LAN can be put to practical use from the band information etc. when the wireless LAN base station to which it can revert exists (step A506). For example, the determination method such that the minimum residual quantity of the electric cell is established for each number of the reversion terminals, and the wireless LAN network 103 is selected as an access network only when the residual quantity of the electric cell is equal to more than it is thinkable. The combined wireless terminal device 110 selects the 3G network 102 as an access network when the residual quantity of the electric cell does not reach the required value (step A507).

For example, in the case that the application classification is a voice application, the wireless LAN network 103 is selected when the residual quantity of the electric cell is equal to or more than 70% on condition that the number of times of re-transmission is two or less, the wireless LAN network 103 is selected when the residual quantity of the electric cell is equal to or more than 80% on condition that the number of times of re-transmission is three or less, and the wireless LAN network 103 is selected when the residual quantity of the electric cell is equal to or more than 90% on condition that the number of times of re-transmission is four or less. On the other hand, in the case that the application classification is an application such as a Web application, the wireless LAN network 103 is selected when the residual quantity of the electric cell is equal to or more than 40% on condition that the number of times of re-transmission is two or less, the wireless LAN network 103 is selected when the residual quantity of the electric cell is equal to or more than 50% on condition that the the number of times of re-transmission is three or less, and the wireless LAN network 103 is selected when the residual quantity of the electric cell is equal to or more than 60% on condition that the number of times of re-transmission is four or less.

The combined wireless terminal device 110 selects the wireless LAN network 103 as an access network when the residual quantity of the electric cell satisfies a required value, reverts to the wireless LAN base station, and commences communication (step A508 to step A512).

An operation of finishing the communication is similar to that of the example 1.

A fourth embodiment will be explained.

The fourth embodiment is an embodiment having an application information storage unit 901 and its function added to the application function unit 403 of FIG. 12 in the third embodiment.

Figure 14:
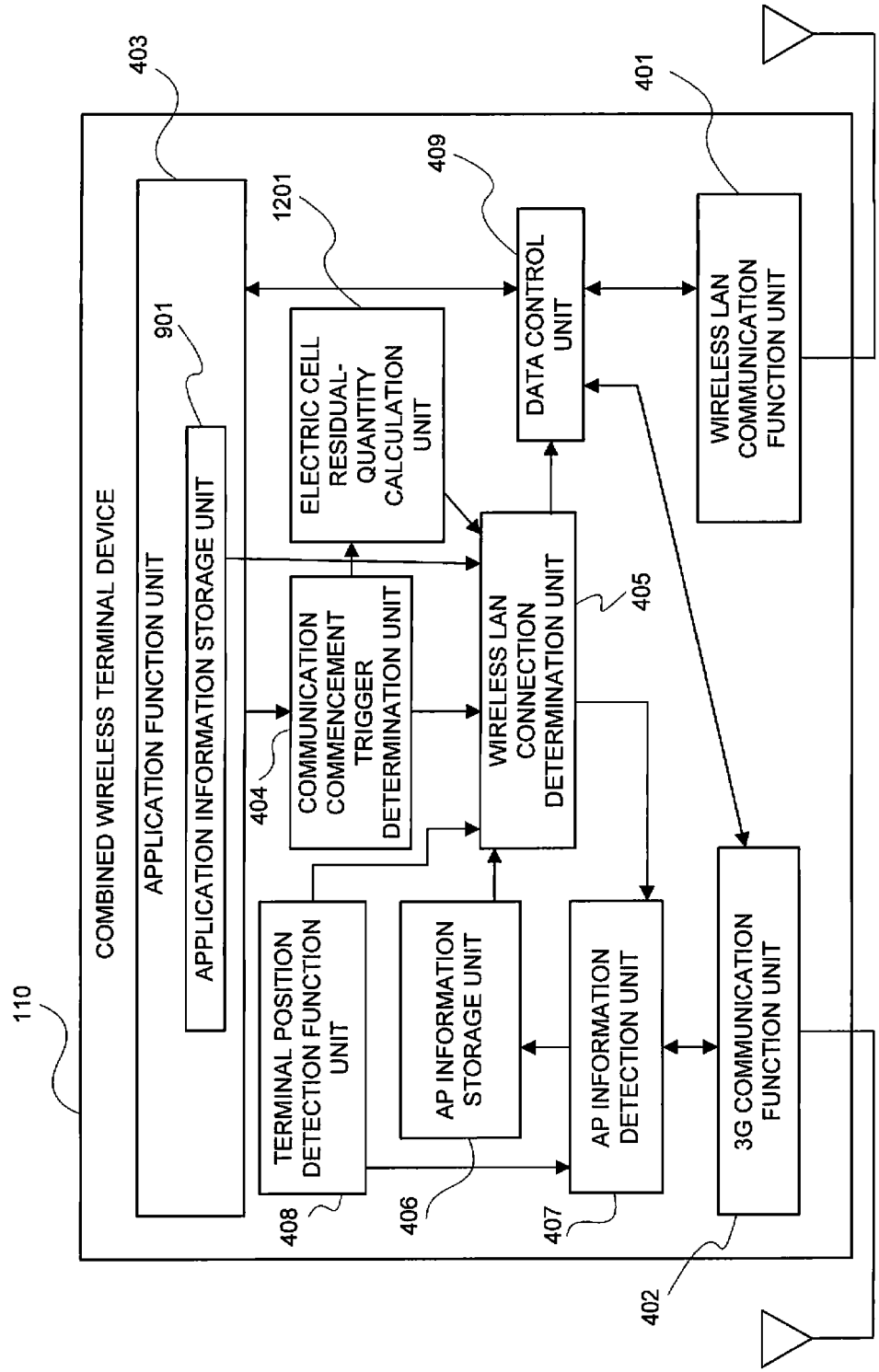
FIG. 14 is a view illustrating a configuration of the combined wireless terminal device of a fourth embodiment of the present invention.

Upon making a reference to FIG. 14, the combined wireless terminal device 110 of the fourth embodiment differs from that of the third embodiment shown in FIG. 12 in a point of including the application information storage unit 901.

After the trigger for commencing communication has been detected by the communication commencement trigger determination unit 404, the application function unit stores the application information in the application information storage unit 901, and notifies it to the wireless LAN connection determination unit 405. On the other hand, the electric cell residual-quantity calculation unit 1201 calculates the residual quantity of the electric cell of its own terminal, and notifies it to the wireless LAN connection determination unit 405. The wireless LAN connection determination unit 405 takes the wireless LAN base station information as a determination material similarly to the case of the first embodiment, and takes not only the application information but also the residual quantity of the electric cell additionally as a determination material, thereby to determine whether or not to select the wireless LAN network 103 as an access network.

Continuously, an operation of the fourth embodiment will be explained. Additionally, in the following explanation, a point in which the fourth embodiment differs from the first embodiment, out of operations inside the combined wireless terminal device 110 relating to the selection of the connection network, will be explained in details with it at a center.

At first, the communication commencement trigger determination unit 404 detects the trigger for commencing communication from the application function unit 403.

The communication commencement trigger determination unit 404 notifies the communication commencement to the wireless LAN connection determination unit 405.

The wireless LAN base station information detection unit 407 acquires the connectable wireless LAN base station information through the 3G communication function unit 402, and stores it in the wireless LAN base station information storage unit 406. At that time, the terminal position detection unit 408 may detect a position of its own terminal to notify its position information to the wireless LAN base station information detection unit 407, and to acquire information of only the wireless LAN base station device, which is located in the vicinity, from the position of its own terminal.

On the other hand, the application function unit 403 stores the application information in the application information storage unit 901. This information is notified to the wireless LAN connection determination unit 405 by the application information storage unit 901.

In addition hereto, the electric cell residual-quantity calculation unit 1201 having received the communication commencement notification calculates the residual quantity of the electric cell of its own terminal, and notifies its value to the wireless LAN connection determination unit 405.

The wireless LAN connection determination unit 405, similarly to the case of the first embodiment, acquires the wireless LAN base station information from the wireless LAN base station information storage unit 406 as a criterion for determining whether or not to select the wireless LAN network 103 as an access network. Further, the wireless LAN connection determination unit 405 in this embodiment determines whether or not to select the wireless LAN network 103 as an access network by taking the application information and the residual quantity of the electric cell besides the wireless LAN base station information into consideration. It selects the wireless LAN network 103 as an access network only in the case of the residual quantity of the electric cell that can bear the wireless LAN communication that corresponds to the above application.

Additionally, herein, the combined wireless terminal device 110 decided the access network by taking the wireless LAN base station information, the application information, the residual quantity of the electric cell, and the terminal position information as a determination material. However, the combined wireless terminal device 110 notifies the required communication quality, the application information, the residual quantity of the electric cell, and the terminal position information to the wireless LAN base station monitoring server device 105 through the 3G communication function unit 402, and thereby, the wireless LAN base station monitoring server device 105 may bear one part of the function of selecting the access network to which the corresponding combined wireless terminal device 110 sets up a connection from the wireless LAN base station information, the application information, the residual quantity of the electric cell, and the terminal position information. The application information differs application by application, so the similar procedure is performed also in the case that another application is started, and another communication is commenced during communication. Thus, a status in which a connection to the 3G network 102 and a connection to the wireless LAN network 103 are simultaneously set up could occur. Herein, the communication associated with information necessary for controlling communication may be made through the 3G network 102 at any time irrespective of the situation of the wireless LAN communication in the combined wireless terminal device 110.

At the moment that the communication corresponding to all applications is finished, the combined wireless terminal device 110 cancels the start of the wireless LAN transmission/reception function, and returns to the normal communication using only the 3G network 102.

As mentioned above, in the fourth embodiment, additionally taking the application information and the residual quantity of the electric cell besides the connectable wireless LAN base station information as a material for determining selection of the access network makes it possible to more appropriately determine the connection network. With it, the communication using the wireless LAN can be effectively suppressed, and an effect of saving the power during communication can be expected.

EXAMPLE 4

Next, the example 4 of the present invention will be explained by making a reference to the accompanied drawings. The example 4 corresponds to the foregoing fourth embodiment.

Figure 15:
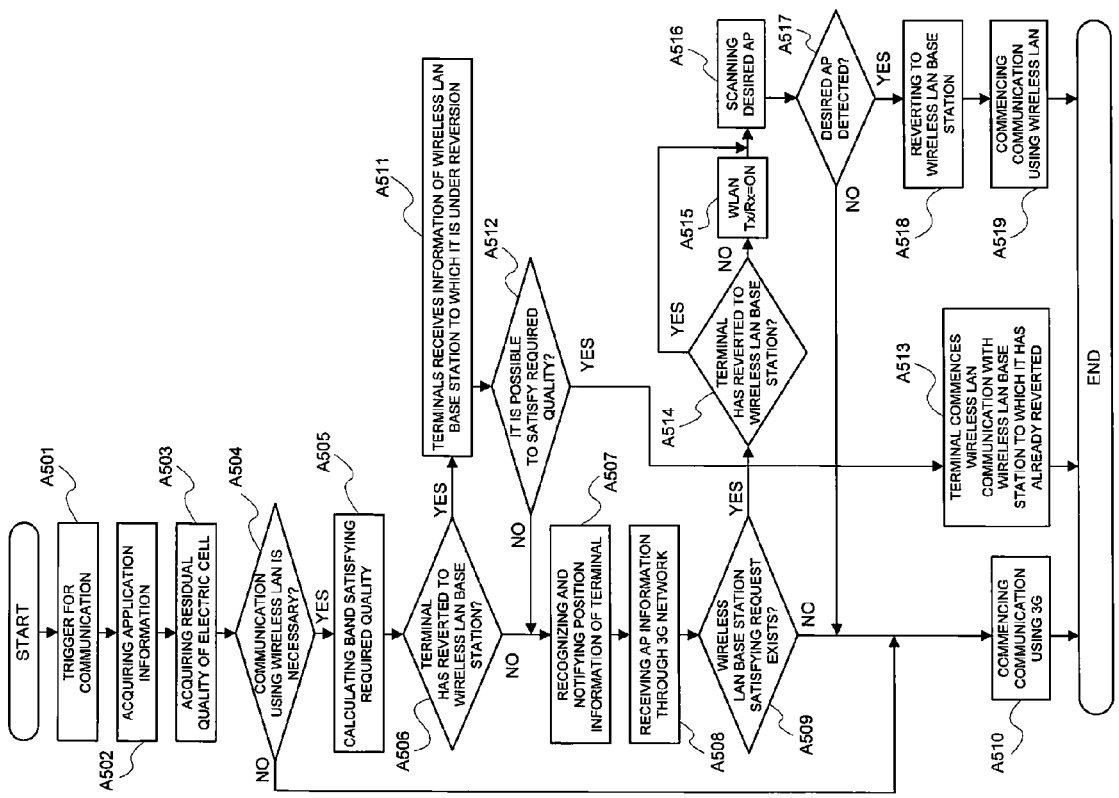
FIG. 15 is a flowchart illustrating an operation of the combined wireless terminal at the moment of selecting an access network and commencing communication, out of operations in the fourth embodiment of the present invention.

An operation that the combined wireless terminal device 110 of this example 4 selects the access network, and commences communication will be explained in details by making a reference to a flowchart of FIG. 15 and a configuration view of the combined wireless terminal device 110 of FIG. 14. FIG. 15 is a flowchart of an operation of the combined wireless terminal device 110 ranging from the trigger for commencing communication and the determination for selecting the access network being made at that moment to the communication commencement.

At first, the combined wireless terminal device 110 receives the trigger for commencing communication from the application function unit 403 (step A501). With it, the wireless LAN connection determination unit 405 acquires the application information accompanied with communication from the application information storage unit 901 (step A502), and the residual quantity of the electric cell from the electric cell residual-quantity calculation unit 1201 (step A503).

The combined wireless terminal device 110 determines whether the communication using the wireless LAN is required for the above application information by taking the residual quantity of the electric cell as well into consideration (step A504). For example, specific features of the high-speed wireless LAN can be put to practical use, but the current residual quantity of the electric cell cannot bear the power necessary for its communication when the packet size is large, whereby the combined wireless terminal device 110 makes such a determination of not making the communication using the wireless LAN of which the burden is large.

Specifically, in the case that the application classification is a voice application, the information of the band occupation situation is "Station Count", and the connection specification of the wireless LAN is IEEE802.11b, a connection to the wireless LAN is decided when the number of the connected terminals is five or less, and yet the residual quantity of the electric cell is 70% or more, and a connection to the wireless LAN is decided when the number of the connected terminals is six or less, and yet the residual quantity of the electric cell is 80% or more. On the other hand, in the case that the application classification is a Web application, the information of the band occupation situation is "Station Count", and the connection specification of the wireless LAN is IEEE802.11b, a connection to the wireless LAN is decided when the number of the connected terminals is five or less, and yet the residual quantity of the electric cell is 40% or more, and a connection to the wireless LAN is decided when the number of the connected terminals is six or less, and yet the residual quantity of the electric cell is 50% or more.

Further, in the case that the information of the band occupation situation is "Channel Utilization" and the application classification is a voice application, a connection to the wireless LAN is decided when the "Channel Utilization" is 80% and less than, and yet the residual quantity of the electric cell is 50% or more, and in the case that the application classification is a Web application, a connection to the wireless LAN is decided when the "Channel Utilization" is 80% or less, and yet the residual quantity of the electric cell is 40% or more.

When the combined wireless terminal device 110 does not make the communication using the wireless LAN, it makes the communication via the 3G network without scanning the wireless LAN base station (step A510). Further, the combined wireless terminal device 110 determines that the communication connected to the wireless LAN network 103 is required in the case that the packet size is large, or in the case that the application is such an application of which the communication cost in the 3G network 102 is high, and yet the required residual quantity of the electric cell is secured.

When the combined wireless terminal device 110 has selected the wireless LAN, it computes a value corresponding to the band occupation that becomes necessary from the above application information (step A505). And, at that time, when the combined wireless terminal device 110 has already set up a connection to the wireless LAN network 103 in the communication corresponding to another application information, it acquires the wireless LAN base station information of the wireless LAN base station to which it has already reverted, and determines whether communication satisfying the request can be made (step A506, A511, and A512). The determination method at this time is similar to that of step of A305, A310, and A311 of the example 2, so its explanation is omitted herein.

The combined wireless terminal device 110 makes the communication corresponding to the above application information via the wireless LAN base station to which it is already under reversion when the information of the wireless LAN base station to which it is under reversion satisfies the request (step A513).

The combined wireless terminal device 110 acquires the wireless LAN base station information from the wireless LAN base station monitoring server device 105 through the 3G network 102 when it is determined that the request is not satisfied from the wireless LAN base station information of the wireless LAN base station to which it is under reversion (step A508). Herein, the combined wireless terminal device 110 may detect the position information of its own terminal to notify it to the wireless LAN base station monitoring server device 105 (step A507). The combined wireless terminal device 110, similarly to the case of the example 1, detects/ revert to the desired wireless LAN base station, and commences communication using the wireless LAN that corresponds to the above application information (steps A514 to A519) when it is determined that the wireless LAN base station satisfying the request exists from the acquired wireless LAN base station information (step A509).

An operation of finishing the communication is similar to that of the example 2.

<Fifth Embodiment>

A fifth embodiment of the present invention will be explained in details by making a reference to the accompanied drawings.

In the foregoing first to fourth embodiments, the combined wireless terminal device 110 received the wireless LAN base station information, for example, the position information of the wireless LAN base station, the band occupation situation, the base station information necessary for a connection, or the like from the wireless LAN base station monitoring server device 105, and determined whether to set up a connection to the wireless LAN network. However, it is also possible for the wireless LAN base station monitoring server device 105 to determine whether to set up a connection to the wireless LAN network. Thereupon, in the fifth embodiment, the mode in which the wireless LAN base station monitoring server device 105 determines whether to set up a connection to the wireless LAN network will be explained. Additionally, the detailed explanation of a configuration similar to that of the foregoing first to fourth embodiments is omitted.

At first, a configuration of the wireless communication control system for which the fifth embodiment is applied is similar to one shown in FIG. 1. Further, a configuration as well of each of the wireless LAN base station devices 107 to 109 is similar to that of the foregoing first and fourth embodiments.

<Explanation of the Wireless LAN Base Station Monitoring Server Device 105>

Figure 16:
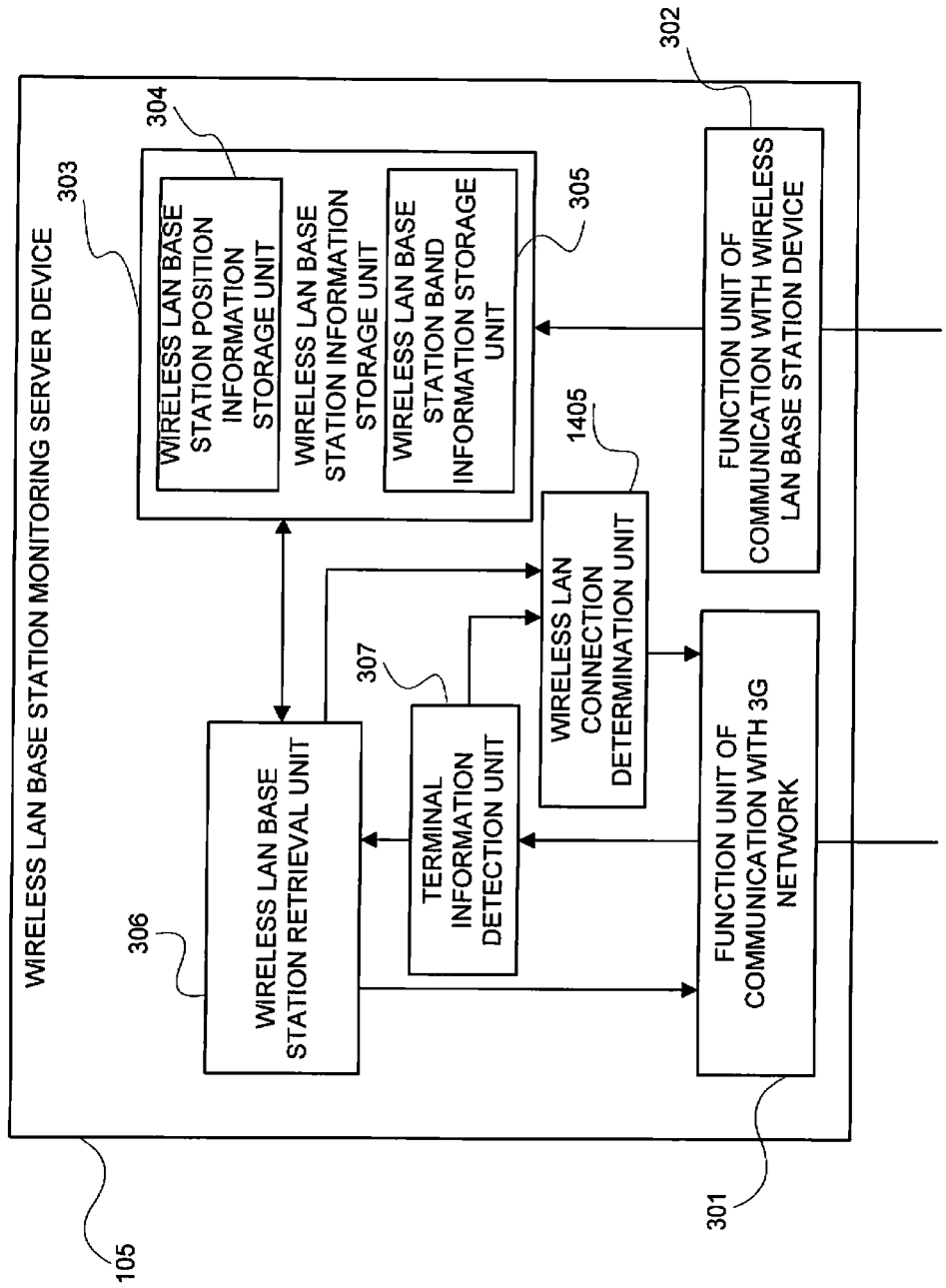
FIG. 16 is a view illustrating a configuration of the wireless LAN base station monitoring server device in a fifth embodiment of the present invention.

FIG. 16 is a view illustrating a configuration of the wireless LAN base station monitoring server device 105 relating to the fifth embodiment of the present invention.

A point in which the fifth embodiment differs from the foregoing embodiments is to including a wireless LAN connection determination unit 1405. This wireless LAN connection determination unit 1405 receives the wireless LAN base station information, for example, the position, the band occupation situation, the base station information necessary for a connection, or the like coming from the wireless LAN base station retrieval unit 306, and performs an operation similar to that of the wireless LAN connection determination unit 405 of the combined wireless terminal device 110 in the foregoing embodiments. That is, the wireless LAN connection determination unit 1405, upon receipt of the trigger for commencing communication (including the position information of the terminal, the required communication quality, etc.) from the combined wireless terminal device 110, determines whether or not the combined wireless terminal device 110 can set up a connection to the wireless LAN network 103. And, it transmits a result as to whether or not the connection is possible to the combined wireless terminal device 110 through the 3G network 102.

<Explanation of the Combined Wireless Terminal Device 110>

Figure 17:
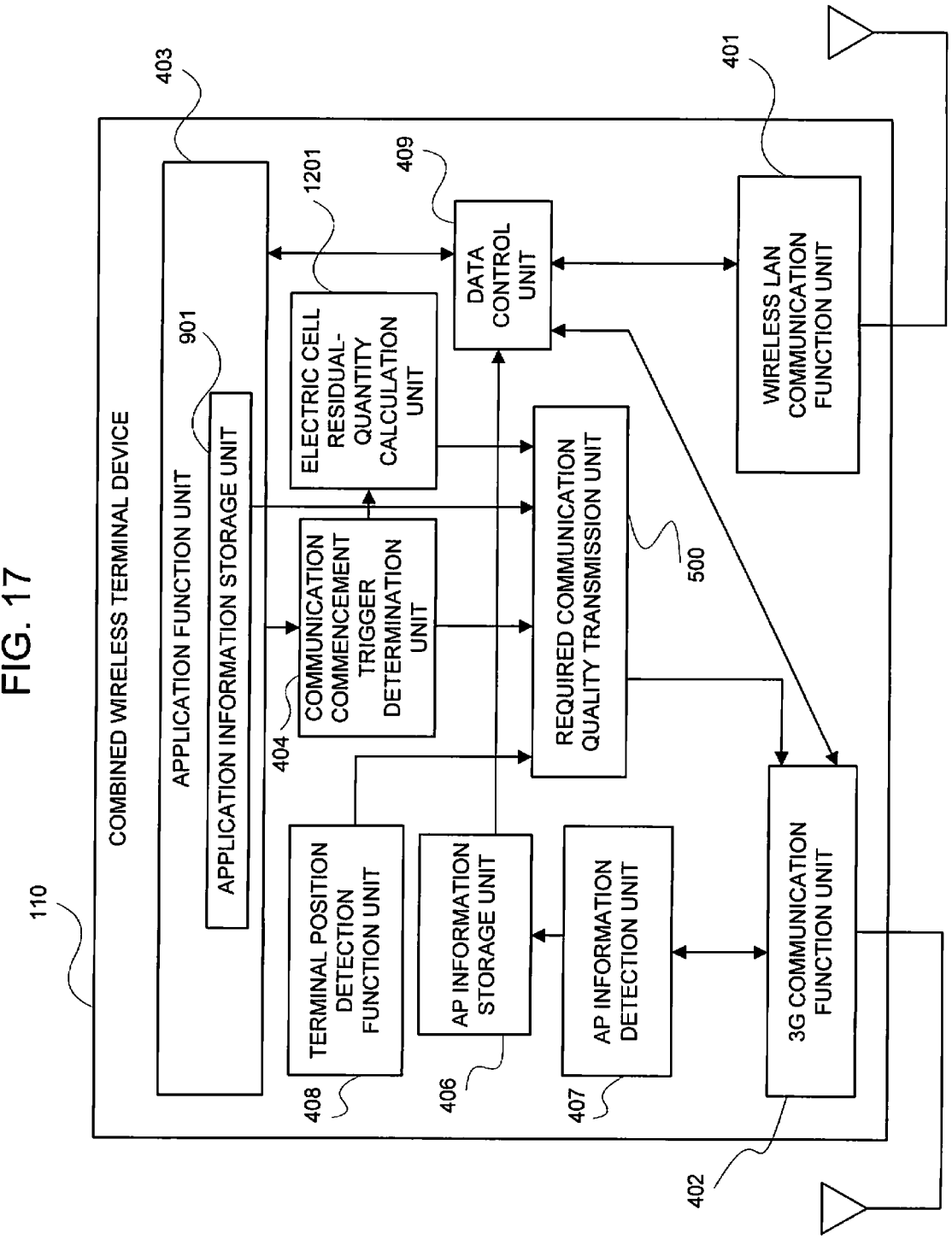
FIG. 17 is a view illustrating a configuration of the combined wireless terminal device in the fifth embodiment of the present invention.

FIG. 17 is a view illustrating a configuration of the combined wireless terminal device 110 relating to the fifth embodiment of the present invention.

A point in which the fifth embodiment differs from the foregoing embodiments is that the wireless LAN connection determination unit 405 is deleted, and the data control unit 409, upon receipt of a result as to whether or not a connection to the wireless LAN is possible from the wireless LAN base station monitoring server device 105, receives/delivers the packet between the application function unit 403 and the selected communication function unit, which is accompanied with transmission/reception during communication. Herein, the frame having information necessary for controlling communication as data may be transmitted/received through the 3G network 102 at any time irrespective of the situation of the wireless LAN communication in the combined wireless terminal device 110.

Further, the fifth embodiment includes a required communication quality transmission unit 500, and this required communication quality transmission unit 500, at the time of transmitting the trigger for commencing communication, transmits the information as well such as the required communication quality, the application information, and the residual quantity of the electric cell.

<Explanation of an Operation>

Next, the entirety of the operation by each device in the case that the wireless LAN network 103 is selected as an access network in this embodiment will be explained.

Each of the wireless LAN base station devices 107 that are being monitored by the wireless LAN base station monitoring server device 105 notifies the wireless LAN base station information of its own base station to the wireless LAN base station monitoring server device 105. The communication between each of the wireless LAN base station devices 107 to 109 and the wireless LAN base station monitoring server device 105 is made via the internet 101, and the 3G network 102, the wireless LAN network 103, the wire network, etc. are thinkable as an access network that is used at that moment.

Herein, the so-called wireless LAN base station information is information that becomes necessary when the combined wireless terminal device 110 is to set up a connection to the corresponding wireless LAN base station, for example, the position information of its own base station, the band occupation situation, or the like. With regard to the band occupation information, in the standard specification 802.11 of the wireless LAN, the number of times of retransmission has already been specified for each terminal, and the above specification becomes an index for the communication situation of the wireless LAN base station. Further, in 802.11e, "Station Count", "Channel Utilization", and "Available Admission Capacity" are specified, by using a parameter element that is called QBSS Load element.

The combined wireless terminal device 110, which is to commence communication, notifies the position information of its own terminal, the required communication quality, etc. to the wireless LAN base station monitoring server device 105 through the 3G base station 104. The wireless LAN base station monitoring server device 105 acquires information as to whether or not the connectable base station device exists, and if it exists, its wireless LAN base station information based upon the information obtained from the combined wireless terminal device 110.

The wireless LAN connection determination unit 1405 of the wireless LAN base station monitoring server device 105 selects the 3G network 102 without setting up a connection to the wireless LAN network 103 when it is estimated that even though the connectable wireless LAN base station exists, the required quality cannot be secured due to a high band occupation ratio, or the like, and transmits its result to the combined wireless terminal device 110 via the 3G network 102. On the other hand, when the wireless LAN connection determination unit 1405 has selected the wireless LAN network 103 as an access network, it transmits its result and the wireless LAN base station information necessary for a connection to the combined wireless terminal device 110 via the 3G network 102.

The combined wireless terminal device 110 receives s result as to whether or not a connection to the wireless LAN network 103 is possible, and starts the transmission/reception function of the wireless LAN based upon the received wireless LAN base station information necessary for a connection when a connection to the wireless LAN network 103 is possible. Thereafter, the combined wireless terminal device 110 reverts to the desired wireless LAN base station device 107, and commences the wireless LAN communication. At the moment that a series of the transmission/reception is finished, the combined wireless terminal device 110 cancels reversion to the desired wireless LAN base station device 107, cancels the start of the wireless LAN transmission/reception function, and returns to the normal communication of only the 3G network 102. Herein, the frame having information necessary for controlling communication as data may be transmitted/ received through the 3G network 102 at any time irrespective of the situation of the wireless LAN communication in the combined wireless terminal device 110.

In such a manner, by causing the wireless LAN base station monitoring server device 105 to determine whether or not a connection to the wireless LAN network 103 is possible, and causing the combined wireless terminal device 110 to operate so that it performs only an operation of setting up a connection to the wireless LAN network 103 based upon its result, the configuration of the combined wireless terminal device 110 becomes a simplified one, and an ability as well, which is originally necessary in a process of determining whether or not the connection is possible, becomes unnecessary.

<Sixth Embodiment>

A sixth embodiment of the present invention will be explained in details by making a reference to the accompanied drawings.

The case that the combined wireless terminal device 110 determined whether to set up a connection to the wireless LAN network in the foregoing first to fourth embodiments, and the wireless LAN base station monitoring server device 105 determined a connection to the wireless LAN network by the combined wireless terminal device 110 in the fifth embodiment was explained. However, it is also possible for the wireless LAN base station to determine a connection to the wireless LAN network by the combined wireless terminal device 110. Thereupon, in the sixth embodiment, the mode that the wireless LAN base station determines a connection to the wireless LAN network by the combined wireless terminal device 110 will be explained. Additionally, the combined wireless terminal device 110 of the sixth embodiment is similar to that of the fifth embodiment, so only the wireless LAN base station monitoring server device 105, and the wireless LAN base station devices 107 and 108, which differ from that of other modes, respectively, will be explained. Further, the detailed explanation of the other components, which are similar to that of the foregoing first to five embodiments, is omitted.

<Explanation of the Wireless LAN Base Station Monitoring Server Device 105>

Figure 18:
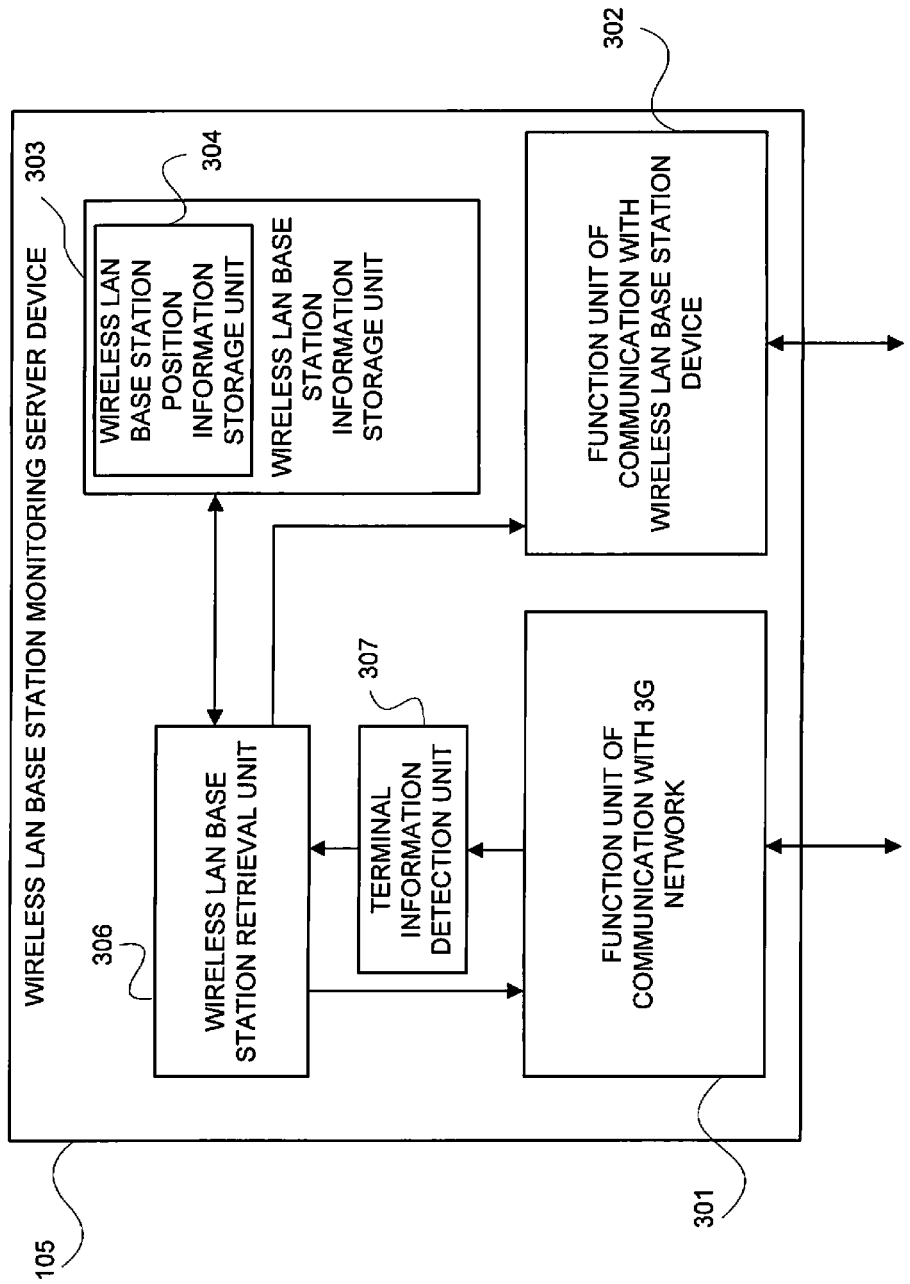
FIG. 18 is a view illustrating a configuration of the wireless LAN base station monitoring server device in a sixth embodiment of the present invention.

FIG. 18 is a view illustrating a configuration of the wireless LAN base station monitoring server device 105 relating to the sixth embodiment of the present invention.

A point in which the wireless LAN base station monitoring server device 105 of the six embodiment differs from that of the foregoing embodiments is that the wireless LAN base station band information storage unit 305 is deleted, and the wireless LAN base station retrieval unit 306 selects the wireless LAN base station device to which the combined wireless terminal device 110 is connectable from the position information of the combined wireless terminal device 110 detected by the terminal position information retrieval unit 307, and notifies the required communication quality (including the terminal position information, if necessary) notified from the combined wireless terminal device 110 to the selected wireless LAN base station device (for example, the wireless LAN base station devices 107 and 108) via the communication function unit 302.

Further, the wireless LAN base station retrieval unit 306 transmits the connection determination information coming from the wireless LAN base station device (for example, information as to whether or not the connection is possible and the wireless LAN base station information necessary for a connection) to the combined wireless terminal device 110 via the communication function unit 302.

<Explanation of the Wireless LAN Base Station Devices 107, 108, and 109>

Figure 19:
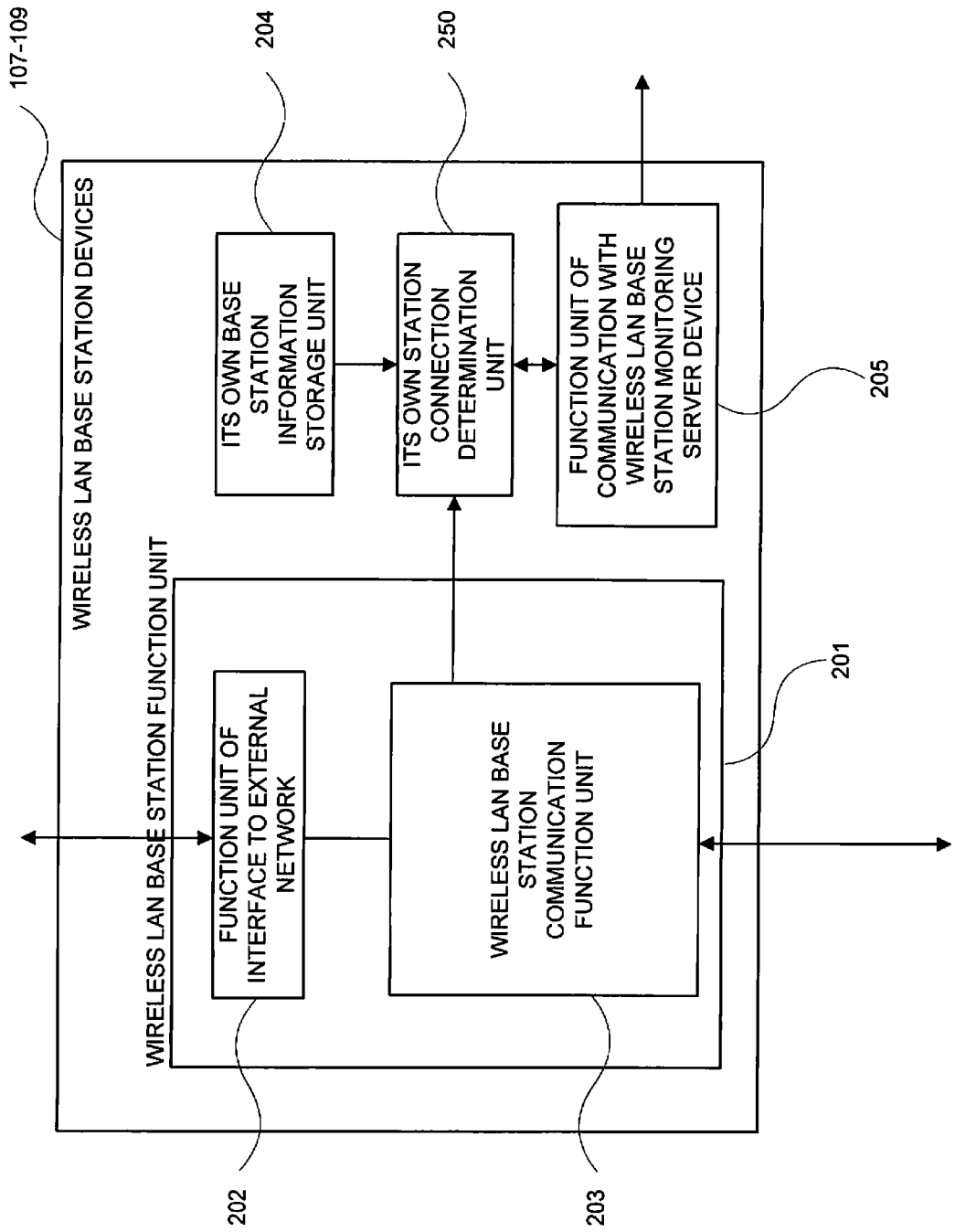
FIG. 19 is a view illustrating a configuration of the wireless LAN base station device in the sixth embodiment of the present invention.

FIG. 19 is a view illustrating a configuration of the wireless LAN base station devices 107, 108, and 109 relating to the sixth embodiment of the present invention.

A point in which the wireless LAN base station devices 107, 108, and 109 of the sixth embodiment differ from that of the foregoing embodiments is to include an its own station connection determination unit 250. This its own station connection determination unit 250 receives the required communication quality from the wireless LAN base station monitoring server device 105, and determines whether or not the its own wireless LAN base station device can satisfy the required quality of the combined wireless terminal device 110 based upon the information (the band occupation situation) of its own station stored in the its own base station information storage unit 204. And, it notifies its determination result to the combined wireless terminal device 110 via the wireless LAN base station monitoring server device 105 and the 3G base station device 104.

<Explanation of an Operation>

Next, the entirety of the operation by each device in the case that the wireless LAN network 103 is selected as an access network in this embodiment will be explained.

The combined wireless terminal device 110, which is to commence communication, notifies the position information of its own terminal, the required communication quality, etc. to the wireless LAN base station monitoring server device 105 through the 3G base station 104.

The wireless LAN base station monitoring server device 105 determines and selects the connectable wireless LAN base station device based upon the position information obtained from the combined wireless terminal device 110. And, it notifies the required communication quality notified from the combined wireless terminal device 110 to the selected wireless LAN base station device via the communication function unit 302.

When the its own station connection determination unit 250 of the wireless LAN base station device receives the required communication quality from the wireless LAN base station monitoring server device 105, and has determined that the its own wireless LAN base station device can satisfy the required quality of the combined wireless terminal device 110, it notifies a determination result saying that a connection to the wireless LAN network 103 is possible, and the wireless LAN base station information to the combined wireless terminal device 110 via the wireless LAN base station monitoring server device 105 and the 3G base station 104. On the other hand, when the its own station connection determination unit 250 of the wireless LAN base station devices 107 and 108 has determined that the its own wireless LAN base station device cannot satisfy the required quality of the combined wireless terminal device 110, it notifies a determination result saying that a connection to the wireless LAN network 103 should not set up to the combined wireless terminal device 110 via the wireless LAN base station monitoring server device 105 and the 3G base station 104.

When the combined wireless terminal device 110 receives the result as to whether or not the connection is possible, and if a connection to the wireless LAN network 103 is possible, it starts the transmission/reception function of the wireless LAN based upon the received wireless LAN base station information necessary for a connection. Thereafter, the combined wireless terminal device 110 reverts to the desired wireless LAN base station device 107, and commences the wireless LAN communication. At the moment that a series of the transmission/reception is finished, the combined wireless terminal device 110 cancels reversion to the desired wireless LAN base station device 107, cancels the start of the wireless LAN transmission/reception function, and returns to the normal communication of only the 3G network 102. Herein, the frame having information necessary for controlling communication as data may be transmitted/received through the 3G network 102 at any time irrespective of the situation of the wireless LAN communication in the combined wireless terminal device 110.

In such a manner, by causing the wireless LAN base station device to determine whether or not a connection to the wireless LAN network 103 is possible, and causing the combined wireless terminal device 110 to operate so that it performs only an operation of setting up a connection to the wireless LAN network 103 based upon its result, the configuration of each of the wireless LAN base station monitoring server device 105 and the combined wireless terminal device 110 becomes a simplified one, and an ability as well, which was originally necessary in a process of determining whether or not the connection is possible, becomes unnecessary.

Additionally, the processing unit of each of the foregoing embodiments can be configured of an information processing device that operates under a program.

The invention claimed is:

1. A wireless communication system in which a wireless terminal is connectable to two wireless communication networks or more, said wireless communication system comprising:
   an acquiring means for acquiring communication quality information associated with a communication quality of a base station in a predetermined wireless communication network to which the wireless terminal can set up a connection through the wireless communication network except said predetermined wireless communication network; and
   a determining means for determining whether said wireless terminal sets up a connection to said predetermined wireless communication network based upon said communication quality information.

2. A wireless communication system according to claim 1, wherein said predetermined communication network is a narrow-range and high-speed communication network, and wherein the wireless communication network through which said communication quality information goes is a wide-range and low-speed wireless communication network.

3. A wireless communication system according to claim 2, wherein said narrow-range and high-speed wireless communication network is a wireless LAN network, and wherein said wide-range and low-speed wireless communication network is a 3G network.

4. A wireless communication system according to claim 1,
   wherein said acquiring means acquires position information associated with a position of the connectable base station and control information necessary for setting up a connection to said base station device in addition to said communication quality information; and
   wherein said determining means determines whether said wireless terminal sets up a connection to said predetermined wireless communication network based upon said acquired position information, control information, and communication quality information.

5. A wireless communication system according to claim 1, wherein said communication quality information is band occupation information of the base station.

6. A wireless communication system according to claim 1, wherein said wireless communication system comprises an application information acquiring means for acquiring application information that said wireless terminal employs for communication; and
   wherein said determining means determines whether said wireless terminal sets up a connection to said predetermined wireless communication network based upon at least each of said application information and said communication quality information.

7. A wireless communication system according claim 1,
   wherein said wireless communication system comprises an electric cell residual-quantity acquiring means for acquiring a residual quantity of an electric cell of said wireless terminal; and
   wherein said determining means determines whether said wireless terminal sets up a connection to said predetermined wireless communication network based upon at least each of said residual quantity of said electric cell and said communication quality information.

8. A wireless communication system comprising:
   a server comprising:
      an acquiring means for acquiring communication quality information associated with a communication quality of a base station in a predetermined wireless communication network; and
      a means for transmitting the communication quality information of the base station to which said wireless terminal is connectable, out of the base stations in said predetermined wireless communication network, to said wireless terminal via the wireless communication network except said predetermined wireless communication network; and
   a wireless terminal comprising a determining means for receiving the communication quality information of the base station in said predetermined wireless communication network via the wireless communication network except said predetermined wireless communication network, and determining whether to set up a connection to said predetermined wireless communication network based upon said communication quality information.

9. A wireless communication system according to claim 8,
   wherein said wireless terminal comprises a means for acquiring position information of its own terminal, and transmitting said position information to said server via the wireless communication network except said predetermined wireless communication network: and
   wherein said server comprises a means for selecting the communication quality information of the base station to which said wireless terminal is connectable based upon the position information of said wireless terminal.

10. A wireless communication system according to one of claim 8, wherein said server comprises a means for acquiring the position information of said wireless terminal, and selecting the communication quality information of the base station to which said wireless terminal is connectable based upon the position information of said wireless terminal.

11. A wireless communication system comprising:
   a server comprising:
      a quality information acquiring means for acquiring communication quality information associated with a communication quality of a base station in a predetermined wireless communication network;
      a determining means for determining whether said wireless terminal sets up a connection to said predetermined wireless communication network based upon the communication quality information of the base station to which said wireless terminal is connectable, out of the base stations in said predetermined wireless communication network; and
      a means for transmitting a determination result by said determining means to said wireless terminal via a wireless communication network except said predetermined wireless communication network; and a wireless terminal comprising a means for receiving said determination result of the connection via the wireless communication network except said predetermined wireless communication network, and setting up a connection to said predetermined wireless communication network based upon said determination result of the connection.

12. A server for managing a wireless terminal that can set up a connection to two wireless communication networks or more, said server comprising:

an acquiring means for acquiring communication quality information associated with a communication quality of a base station in a predetermined wireless communication network; and a means for transmitting the communication quality information of the base station to which said wireless terminal is connectable, out of the base stations in said predetermined wireless communication network, to said wireless terminal via the wireless communication network except said predetermined wireless communication network.

13. A server for managing a wireless terminal that can set up a connection to two wireless communication networks or more, said server comprising:

an acquiring means for acquiring communication quality information associated with a communication quality of a base station in a predetermined wireless communication network;

a determining means for determining whether said wireless terminal sets up a connection to said predetermined wireless communication network based upon the communication quality information of the base station to which said wireless terminal is connectable, out of the base stations in said predetermined wireless communication network; and a means for transmitting a determination result by said determining means to said wireless terminal via the wireless communication network except said predetermined wireless communication network.

14. A wireless terminal that can set up a connection to two wireless communication networks or more, said wireless terminal comprising:

a means for receiving communication quality information of a base station of a predetermined wireless communication network via the wireless communication network except said predetermined wireless communication network; and a determining means for determining whether to set up a connection to said predetermined wireless communication network based upon said communication quality information.

15. A wireless terminal according to claim 14:

wherein said wireless terminal comprises an application information acquiring means for acquiring application information being employed for communication; and wherein said determining means determines whether to set up a connection to said predetermined wireless communication network based upon at least each of said application information and said communication quality information.

16. A wireless terminal according to claim 14:

wherein said wireless terminal comprises an electric cell residual-quantity acquiring means for acquiring a residual quantity of an electric cell; and wherein said determining means determines whether said wireless terminal sets up a connection to said predetermined wireless communication network based upon at least each of said residual quantity of said electric cell and said communication quality information.

17. A wireless terminal according to claim 14, said wireless terminal comprising:

a position acquiring means for acquiring position information of its own terminal; and a means for transmitting said position information to a server via the wireless communication network except said predetermined wireless communication network.

18. A wireless terminal that can set up a connection to two wireless communication networks or more, said wireless terminal comprising:

a means for receiving a determination as to whether or not a connection to a base station of a predetermined wireless communication network is possible via the wireless communication network except said predetermined wireless communication network; and a means for setting up a connection to said predetermined wireless communication network based upon said determination as to whether or not a connection is possible.

19. A wireless terminal according to claim 18, said wireless terminal comprising:

an application information acquiring means for acquiring application information being employed for communication; and a means for transmitting said application information via the wireless communication network except said predetermined wireless communication network.

20. A wireless terminal according to claim 18, said wireless terminal comprising:

an electric cell residual-quantity acquiring means for acquiring a residual quantity of an electric cell; and a means for transmitting said residual quantity of said electric cell via the wireless communication network except said predetermined wireless communication network.

21. A wireless terminal according to claim 18, said wireless terminal comprising:

a position acquiring means for acquiring position information of its own terminal; and a means for transmitting said position information to a server via the wireless communication network except said predetermined wireless communication network.

22. A wireless communication method in which a connection to two wireless communication networks or more is possible, said wireless communication method comprising:

acquiring communication quality information associated with a communication quality of a base station in a predetermined wireless communication network to which a wireless terminal can set up a connection through the wireless communication network except said predetermined wireless communication network; and determining whether said wireless terminal sets up a connection to said predetermined wireless communication network based upon said communication quality information.

23. A non-transitory computer-readable medium storing a program of a server for managing a wireless terminal that can set up a connection to two wireless communication networks or more, said program causing the server to execute the processes of:

acquiring communication quality information associated with a communication quality of a base station in a predetermined wireless communication network; and transmitting the communication quality information of the base station to which said wireless terminal is connectable, out of the base stations in said predetermined wireless communication network, to said wireless terminal via the wireless communication network except said predetermined wireless communication network.

24. A non-transitory computer-readable medium storing a program of a server for managing a wireless terminal that can set up a connection to two wireless communication networks or more, said program causing the server to execute the processes of:

acquiring communication quality information associated with a communication quality of a base station in a predetermined wireless communication network;

determining whether said wireless terminal sets up a connection to said predetermined wireless communication network based upon the communication quality information of the base station to which said wireless terminal is connectable, out of the base stations in said predetermined wireless communication network; and transmitting said determination result to said wireless terminal via the wireless communication network except said predetermined wireless communication network.

25. A non-transitory computer-readable medium storing a program of a wireless terminal that can set up a connection to two wireless communication networks or more, said program causing the wireless terminal to execute the processes of:

receiving communication quality information of a base station of a predetermined wireless communication network via the wireless communication network except said predetermined wireless communication network; and determining whether to set up a connection to said predetermined wireless communication network based upon said communication quality information.

26. A non-transitory computer-readable medium storing a program of a wireless terminal that can set up a connection to two wireless communication networks or more, said program causing the wireless terminal to execute the processes of:

receiving a determination as to whether or not a connection to a base station of a predetermined wireless communication network is possible via the wireless communication network except said predetermined wireless communication network; and setting up a connection to said predetermined wireless communication network based upon said determination as to whether or not a connection is possible.

27. A base station device in a wireless communication system in which a wireless terminal can set up a connection to two wireless communication networks or more, said base station device comprising a means for determining whether a communication quality of its own station satisfies a communication quality that said wireless terminal requests, and transmitting its determination result to said wireless terminal via the wireless communication network different from the wireless communication network of its own station.

* * * * *